(12) United States Patent
Liu et al.

(10) Patent No.: US 11,783,163 B2
(45) Date of Patent: Oct. 10, 2023

(54) HARDWARE ACCELERATOR FOR IM2COL OPERATION

(71) Applicant: Arm Limited, Cambridge (GB)

(72) Inventors: Zhi-Gang Liu, Cambridge, MA (US); Paul Nicholas Whatmough, Westford, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 695 days.

(21) Appl. No.: 16/901,542

(22) Filed: Jun. 15, 2020

(65) Prior Publication Data
US 2021/0390367 A1    Dec. 16, 2021

(51) Int. Cl.
*G06N 3/04* (2023.01)
*G06N 3/08* (2023.01)
*G06F 17/16* (2006.01)
*G06F 9/30* (2018.01)

(52) U.S. Cl.
CPC ........... *G06N 3/04* (2013.01); *G06F 9/30105* (2013.01); *G06F 17/16* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 5,014,235 A * | 5/1991 | Morton | ................... | G06F 17/16 365/185.11 |
| 5,204,830 A * | 4/1993 | Wang | ..................... | G06F 17/16 708/607 |
| 5,867,414 A * | 2/1999 | Kao | ...................... | G06F 17/147 708/607 |
| 11,531,540 B2 * | 12/2022 | Chen | ................... | G06F 9/30007 |
| 2019/0042401 A1 * | 2/2019 | Khan | ..................... | G06F 3/0638 |
| 2019/0095776 A1 * | 3/2019 | Kfir | ...................... | G06F 12/0207 |
| 2019/0114529 A1 * | 4/2019 | Ng | .......................... | G06N 3/063 |
| 2019/0114534 A1 * | 4/2019 | Teng | ....................... | G06N 3/04 |

(Continued)

FOREIGN PATENT DOCUMENTS

| EP | 3951637 A1 * | 2/2022 | ............... G06F 7/50 |
|---|---|---|---|
| GB | 2599377 A * | 4/2022 | ............... G06F 7/50 |

OTHER PUBLICATIONS

Machine Translation of Chinese Patent Application CN113971261 A, Jan. 25, 2022. (Year: 2022).*

(Continued)

*Primary Examiner* — Steven G Snyder
(74) *Attorney, Agent, or Firm* — LEVEQUE INTELLECTUAL PROPERTY LAW, P.C.

(57) ABSTRACT

The present disclosure advantageously provides a matrix expansion unit that includes an input data selector, a first register set, a second register set, and an output data selector. The input data selector is configured to receive first matrix data in a columnwise format. The first register set is coupled to the input data selector, and includes a plurality of data selectors and a plurality of registers arranged in a first shift loop. The second register set is coupled to the data selector, and includes a plurality of data selectors and a plurality of registers arranged in a second shift loop. The output data selector is coupled to the first register set and the second register set, and is configured to output second matrix data in a rowwise format.

18 Claims, 17 Drawing Sheets

(56) References Cited

U.S. PATENT DOCUMENTS

| | | | | |
|---|---|---|---|---|
| 2019/0114535 | A1* | 4/2019 | Ng | G06N 3/045 |
| 2019/0114538 | A1* | 4/2019 | Ng | G06N 3/08 |
| 2019/0146717 | A1* | 5/2019 | Khan | G06F 12/0646 |
| | | | | 711/154 |
| 2020/0050918 | A1* | 2/2020 | Chen | G06F 7/527 |
| 2020/0257472 | A1* | 8/2020 | Garcia | G06F 12/0207 |
| 2020/0356836 | A1* | 11/2020 | Hargil | G06N 3/10 |
| 2020/0356837 | A1* | 11/2020 | Hargil | G06N 3/045 |
| 2021/0263849 | A1* | 8/2021 | Zheng | G06F 9/30134 |
| 2021/0286551 | A1* | 9/2021 | Dongaonkar | G06F 12/0238 |
| 2021/0303358 | A1* | 9/2021 | Zaidy | G06F 7/5443 |
| 2021/0390379 | A1* | 12/2021 | Sun | G06F 9/30127 |

OTHER PUBLICATIONS

'An Architecture to Accelerate Convolution in Deep Neural Networks' by Arash Ardakani et al., IEEE Transactions on Circuits and Systems—I: Regular Papers, vol. 65, No. 4, Apr. 2018. (Year: 2018).*

'An FPGA Based Hardware Accelerator for Classification of Handwritten Digits' by R. Gautham Sundar Ram et al., 18th International Conference on Intelligent Systems Design and Applications (ISDA 2018) held in Vellore, India, Dec. 6-8, 2018. (Year: 2018).*

'cuDNN: Efficient Primitives for Deep Learning' bySharan Chetlur et al., Dec. 2014. (Year: 2014).*

'A Systematic Approach to Blocking Convolutional Neural Networks' by Yang et al., Jun. 2016. (Year: 2016).*

'Optimizing Loop Operation and Dataflow in FPGA Acceleration of Deep Convolutional Neural Networks' by Ma et al., Feb. 2017. (Year: 2017).*

'High Performance and Portable Convolution Operators for Multicore Processors' by Pablo San Juan et al., 2020 IEEE 32nd International Symposium on Computer Architecture and High Performance Computing (SBAC-PAD), Sep. 2020. (Year: 2020).*

Chen et al., "Eyeriss: A Spatial Architecture for Energy-Efficient Dataflow for Convolutional Neural Networks", Dec. 19, 2016, https://people.csail.mit.edu/emer/papers/2016.06.isca.eyeriss_architecture.pdf.

Jouppi et al., "In-Datacenter Performance Analysis of a Tensor Processing Unit," 44th International Symposium on Computer Architecture (ISCA), Toronto, Canada, Jun. 24-28, 2017.

* cited by examiner

FIG. 3B

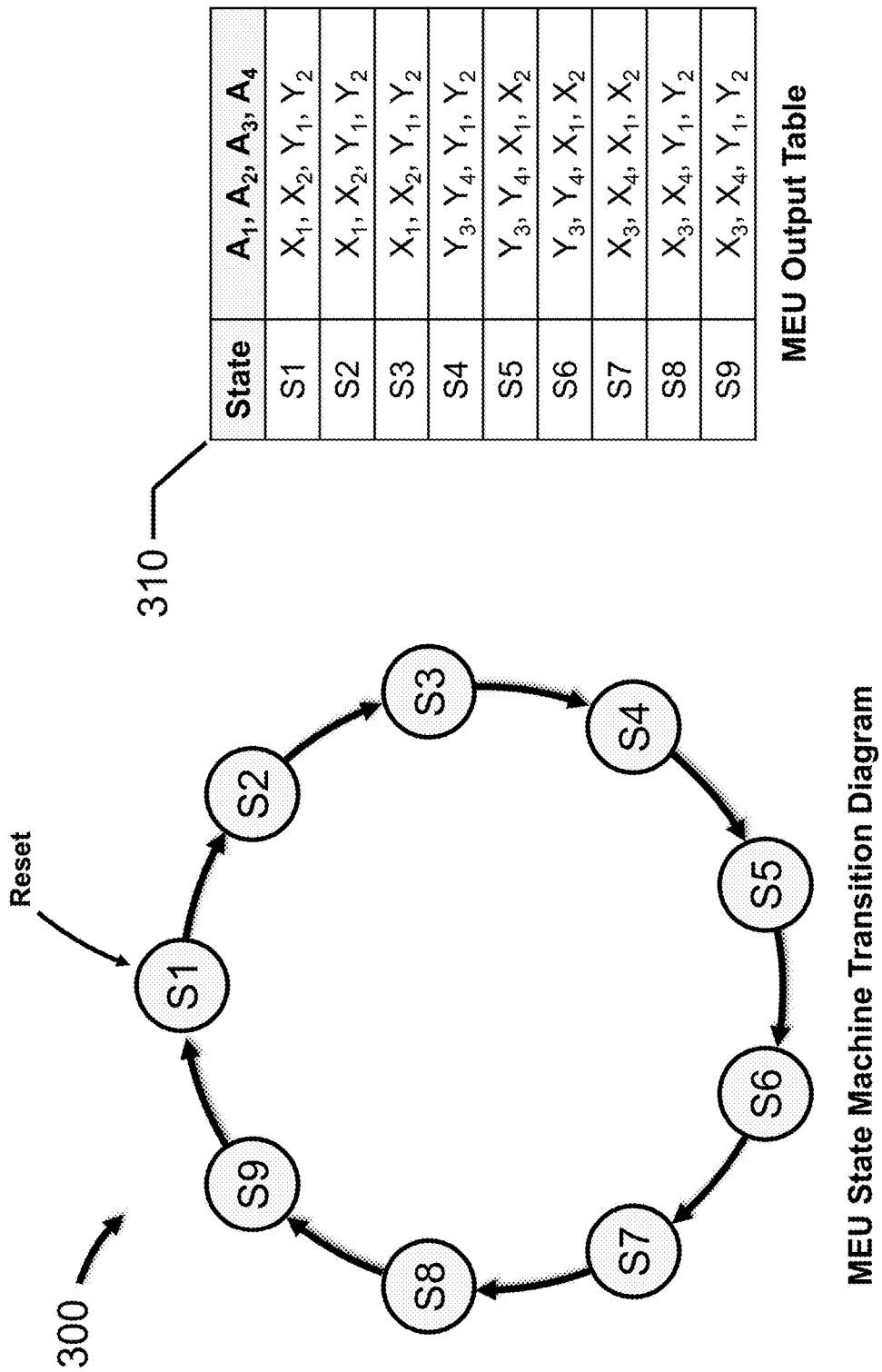

Columnwise Memory Read

320

| State | S1 | S2 | S3 | S4 | S5 | S6 | S7 | S8 | S9 | S1 | S2 |
|---|---|---|---|---|---|---|---|---|---|---|---|
| X1 | $a_1$ | $a_5$ | $a_9$ | $a_{13}$ | $a_3$ | $a_7$ | $a_{11}$ | $a_{15}$ | $a_3$ | $b_1$ | $b_5$ |
| X2 | $a_5$ | $a_9$ | $a_{13}$ | $a_1$ | $a_7$ | $a_{11}$ | $a_{15}$ | $a_3$ | $a_7$ | $b_5$ | $b_9$ |
| X3 | $a_9$ | $a_{13}$ | $a_1$ | $a_5$ | $a_{11}$ | $a_{15}$ | $a_3$ | $a_7$ | $a_{11}$ | $b_9$ | $b_{13}$ |
| X4 | $a_{13}$ | $a_1$ | $a_5$ | $a_9$ | $a_{15}$ | $a_3$ | $a_7$ | $a_{11}$ | $a_{15}$ | $b_{13}$ | $b_1$ |
| Y1 | -- | $a_2$ | $a_6$ | $a_{10}$ | $a_{14}$ | $a_2$ | $a_6$ | $a_4$ | $a_8$ | $a_{12}$ | $b_2$ |
| Y2 | -- | $a_6$ | $a_{10}$ | $a_{14}$ | $a_2$ | $a_6$ | $a_{10}$ | $a_8$ | $a_{12}$ | $a_{16}$ | $b_6$ |
| Y3 | -- | $a_{10}$ | $a_{14}$ | $a_2$ | $a_6$ | $a_{10}$ | $a_{14}$ | $a_{12}$ | $a_{16}$ | $a_4$ | $b_{10}$ |
| Y4 | -- | $a_{14}$ | $a_2$ | $a_6$ | $a_{10}$ | $a_{14}$ | $a_2$ | $a_{16}$ | $a_4$ | $a_8$ | $b_{14}$ |

Shift Loop

FIG. 11A

$A_1, A_2, A_3, A_4$ Output

320

| State | S1 | S2 | S3 | S4 | S5 | S6 | S7 | S8 | S9 | S1 | S2 |
|---|---|---|---|---|---|---|---|---|---|---|---|
| X1 | $a_1$ | $a_5$ | $a_9$ | $a_{13}$ | $a_3$ | $a_7$ | $a_{11}$ | $a_{15}$ | $a_3$ | $b_1$ | $b_5$ |
| X2 | $a_5$ | $a_9$ | $a_{13}$ | $a_1$ | $a_7$ | $a_{11}$ | $a_{15}$ | $a_3$ | $a_7$ | $b_5$ | $b_9$ |
| X3 | $a_9$ | $a_{13}$ | $a_1$ | $a_5$ | $a_{11}$ | $a_{15}$ | $a_3$ | $a_7$ | $a_{11}$ | $b_9$ | $b_{13}$ |
| X4 | $a_{13}$ | $a_1$ | $a_5$ | $a_9$ | $a_{15}$ | $a_3$ | $a_7$ | $a_{11}$ | $a_{15}$ | $b_{13}$ | $b_1$ |
| Y1 | -- | $a_2$ | $a_6$ | $a_{10}$ | $a_{14}$ | $a_2$ | $a_6$ | $a_4$ | $a_8$ | $a_{12}$ | $b_2$ |
| Y2 | -- | $a_6$ | $a_{10}$ | $a_{14}$ | $a_2$ | $a_6$ | $a_{10}$ | $a_8$ | $a_{12}$ | $a_{16}$ | $b_6$ |
| Y3 | -- | $a_{10}$ | $a_{14}$ | $a_2$ | $a_6$ | $a_{10}$ | $a_{14}$ | $a_{12}$ | $a_{16}$ | $a_4$ | $b_{10}$ |
| Y4 | -- | $a_{14}$ | $a_2$ | $a_6$ | $a_{10}$ | $a_{14}$ | $a_2$ | $a_{16}$ | $a_4$ | $a_8$ | $b_{14}$ |

| State | S1 | S2 | S3 | S4 | S5 | S6 | S7 | S8 | S9 | S1 | S2 |
|---|---|---|---|---|---|---|---|---|---|---|---|
| X1 | a₁ | a₅ | a₉ | a₁₃ | a₃ | a₇ | a₁₁ | a₁₅ | a₃ | b₁ | b₅ |
| X2 | a₅ | a₉ | a₁₃ | a₁ | a₇ | a₁₁ | a₁₅ | a₃ | a₇ | b₅ | b₉ |
| X3 | a₉ | a₁₃ | a₁ | a₅ | a₁₁ | a₁₅ | a₃ | a₇ | a₁₁ | b₉ | b₁₃ |
| X4 | a₁₃ | a₁ | a₅ | a₉ | a₁₅ | a₃ | a₇ | a₁₁ | a₁₅ | b₁₃ | b₁ |
| Y1 | -- | a₂ | a₆ | a₁₀ | a₁₄ | a₂ | a₆ | a₄ | a₈ | a₁₂ | b₂ |
| Y2 | -- | a₆ | a₁₀ | a₁₄ | a₂ | a₆ | a₁₀ | a₈ | a₁₂ | a₁₆ | b₆ |
| Y3 | -- | a₁₀ | a₁₄ | a₂ | a₆ | a₁₀ | a₁₄ | a₁₂ | a₁₆ | a₄ | b₁₀ |
| Y4 | -- | a₁₄ | a₂ | a₆ | a₁₀ | a₁₄ | a₂ | a₁₆ | a₄ | a₈ | b₁₄ |

| State | S1 | S2 | S3 | S4 | S5 | S6 | S7 | S8 | S9 | S1 | S2 |
|---|---|---|---|---|---|---|---|---|---|---|---|
| X1 | a₁ | a₅ | a₉ | a₁₃ | a₃ | a₇ | a₁₁ | a₁₅ | a₃ | b₁ | b₅ |
| X2 | a₅ | a₉ | a₁₃ | a₁ | a₇ | a₁₁ | a₁₅ | a₃ | a₇ | b₅ | b₉ |
| X3 | a₉ | a₁₃ | a₁ | a₅ | a₁₁ | a₁₅ | a₃ | a₇ | a₁₁ | b₉ | b₁₃ |
| X4 | a₁₃ | a₁ | a₅ | a₉ | a₁₅ | a₃ | a₇ | a₁₁ | a₁₅ | b₁₃ | b₁ |
| Y1 | -- | a₂ | a₆ | a₁₀ | a₁₄ | a₂ | a₆ | a₄ | a₈ | a₁₂ | b₂ |
| Y2 | -- | a₆ | a₁₀ | a₁₄ | a₂ | a₆ | a₁₀ | a₈ | a₁₂ | a₁₆ | b₆ |
| Y3 | -- | a₁₀ | a₁₄ | a₂ | a₆ | a₁₀ | a₁₄ | a₁₂ | a₁₆ | a₄ | b₁₀ |
| Y4 | -- | a₁₄ | a₂ | a₆ | a₁₀ | a₁₄ | a₂ | a₁₆ | a₄ | a₈ | b₁₄ |

| State | S1 | S2 | S3 | S4 | S5 | S6 | S7 | S8 | S9 | S1 | S2 |
|---|---|---|---|---|---|---|---|---|---|---|---|
| X1 | $a_1$ | $a_5$ | $a_9$ | $a_{13}$ | $a_3$ | $a_7$ | $a_{11}$ | $a_{15}$ | $a_3$ | $b_1$ | $b_5$ |
| X2 | $a_5$ | $a_9$ | $a_{13}$ | $a_1$ | $a_7$ | $a_{11}$ | $a_{15}$ | $a_3$ | $a_7$ | $b_5$ | $b_9$ |
| X3 | $a_9$ | $a_{13}$ | $a_1$ | $a_5$ | $a_{11}$ | $a_{15}$ | $a_3$ | $a_7$ | $a_{11}$ | $b_9$ | $b_{13}$ |
| X4 | $a_{13}$ | $a_1$ | $a_5$ | $a_9$ | $a_{15}$ | $a_3$ | $a_7$ | $a_{11}$ | $a_{15}$ | $b_{13}$ | $b_1$ |
| Y1 | -- | $a_2$ | $a_6$ | $a_{10}$ | $a_{14}$ | $a_2$ | $a_6$ | $a_4$ | $a_8$ | $a_{12}$ | $b_2$ |
| Y2 | -- | $a_6$ | $a_{10}$ | $a_{14}$ | $a_2$ | $a_6$ | $a_{10}$ | $a_8$ | $a_{12}$ | $a_{16}$ | $b_6$ |
| Y3 | -- | $a_{10}$ | $a_{14}$ | $a_2$ | $a_6$ | $a_{10}$ | $a_{14}$ | $a_{12}$ | $a_{16}$ | $a_4$ | $b_{10}$ |
| Y4 | -- | $a_{14}$ | $a_2$ | $a_6$ | $a_{10}$ | $a_{14}$ | $a_2$ | $a_{16}$ | $a_4$ | $a_8$ | $b_{14}$ |

| State | S1 | S2 | S3 | S4 | S5 | S6 | S7 | S8 | S9 | S1 | S2 |
|---|---|---|---|---|---|---|---|---|---|---|---|
| X1 | $a_1$ | $a_5$ | $a_9$ | $a_{13}$ | $a_3$ | $a_7$ | $a_{11}$ | $a_{15}$ | $a_3$ | $b_1$ | $b_5$ |
| X2 | $a_5$ | $a_9$ | $a_{13}$ | $a_1$ | $a_7$ | $a_{11}$ | $a_{15}$ | $a_3$ | $a_7$ | $b_5$ | $b_9$ |
| X3 | $a_9$ | $a_{13}$ | $a_1$ | $a_5$ | $a_{11}$ | $a_{15}$ | $a_3$ | $a_7$ | $a_{11}$ | $b_9$ | $b_{13}$ |
| X4 | $a_{13}$ | $a_1$ | $a_5$ | $a_9$ | $a_{15}$ | $a_3$ | $a_7$ | $a_{11}$ | $a_{15}$ | $b_{13}$ | $b_1$ |
| Y1 | -- | $a_2$ | $a_6$ | $a_{10}$ | $a_{14}$ | $a_2$ | $a_6$ | $a_4$ | $a_8$ | $a_{12}$ | $b_2$ |
| Y2 | -- | $a_6$ | $a_{10}$ | $a_{14}$ | $a_2$ | $a_6$ | $a_{10}$ | $a_8$ | $a_{12}$ | $a_{16}$ | $b_6$ |
| Y3 | -- | $a_{10}$ | $a_{14}$ | $a_2$ | $a_6$ | $a_{10}$ | $a_{14}$ | $a_{12}$ | $a_{16}$ | $a_4$ | $b_{10}$ |
| Y4 | -- | $a_{14}$ | $a_2$ | $a_6$ | $a_{10}$ | $a_{14}$ | $a_2$ | $a_{16}$ | $a_4$ | $a_8$ | $b_{14}$ |

FIG. 11F

HARDWARE ACCELERATOR FOR IM2COL OPERATION

BACKGROUND

The present disclosure relates to computer systems. More particularly, the present disclosure relates to computer systems that include neural networks.

Artificial neural networks (ANNs), such as deep neural networks (DNNs), convolutional neural networks (CNNs), etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, convolution operations performed by CNNs.

Typically, native convolution operations are not performed by a CNN due to the complicated dataflow and expensive datapaths that are usually required. Instead, native convolution operations are converted into generic matrix multiplication (GEMM) operations, and then the GEMM operations are executed more efficiently by a central processing unit (CPU), specialized processor, hardware accelerator processing engine, etc., using optimized software libraries or specialized hardware. More particularly, an "IM2COL" software function is used to convert the filter (weight) matrix and the input feature map (IFM) matrix for each convolution operation into an expanded format that is compatible with a GEMM operation. The IM2COL versions of each filter (weight) matrix and each IFM matrix are generated and stored in memory, and then loaded from memory and processed by the GEMM operation.

Unfortunately, the IM2COL version of each IFM matrix is much larger than the original version because many elements of the original version are duplicated in the IM2COL version. Consequently, the performance of the GEMM-based convolution operation is low, and the memory requirement high, because many elements of each original IFM matrix must be stored in (and subsequently loaded from) memory multiple times due to the expanded format of the IM2COL version.

BRIEF DESCRIPTION OF THE DRAWINGS

FIGS. 3B and 3C depict a converted convolutional layer calculation for a CNN, in accordance with an embodiment of the present disclosure.

FIG. 10A depicts a state diagram for a matrix expansion unit, in accordance with an embodiment of the present disclosure.

FIG. 10B depicts an output table for a matrix expansion unit, in accordance with an embodiment of the present disclosure.

FIGS. 11A to 11F depict state tables for a matrix expansion unit, in accordance with an embodiment of the present disclosure.

DETAILED DESCRIPTION

Figure 1:
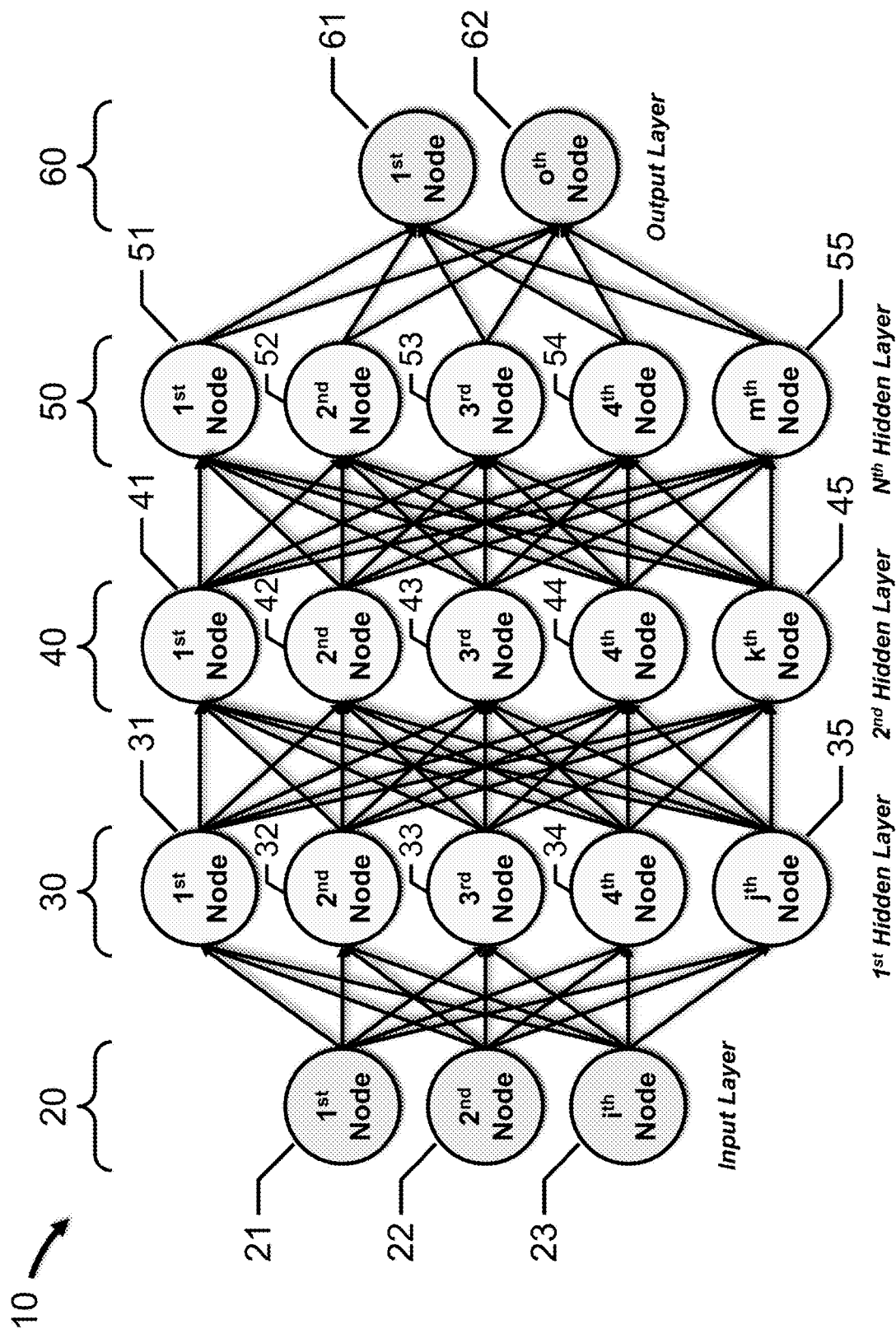
FIG. 1 depicts an ANN, in accordance with embodiments of the present disclosure.

Embodiments of the present disclosure will now be described with reference to the drawing figures, in which like reference numerals refer to like parts throughout.

Embodiments of the present disclosure advantageously provide a matrix expansion unit that efficiently implements the IM2COL software function in hardware. The matrix expansion unit is disposed inline between the memory and the CPU, specialized processor, hardware accelerator processing engine, etc., and converts the original version of the IFM matrix to an IM2COL version. The matrix expansion unit advantageously reduces the memory footprint to that of the native convolution operation, reduces the memory bandwidth required for data movement, which increases the power efficiency at the system level, and takes advantage of the compute regularity of matrix multiplication, which can be more readily optimized in hardware.

In one embodiment, a matrix expansion unit includes an input data selector, a first register set, a second register set, and an output data selector. The input data selector is configured to receive first matrix data in a columnwise format. The first register set is coupled to the input data selector, and includes a plurality of data selectors and a plurality of registers arranged in a first shift loop. The second register set is coupled to the data selector, and includes a plurality of data selectors and a plurality of registers arranged in a second shift loop. The output data selector is coupled to the first register set and the second register set, and is configured to output second matrix data in a rowwise format.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
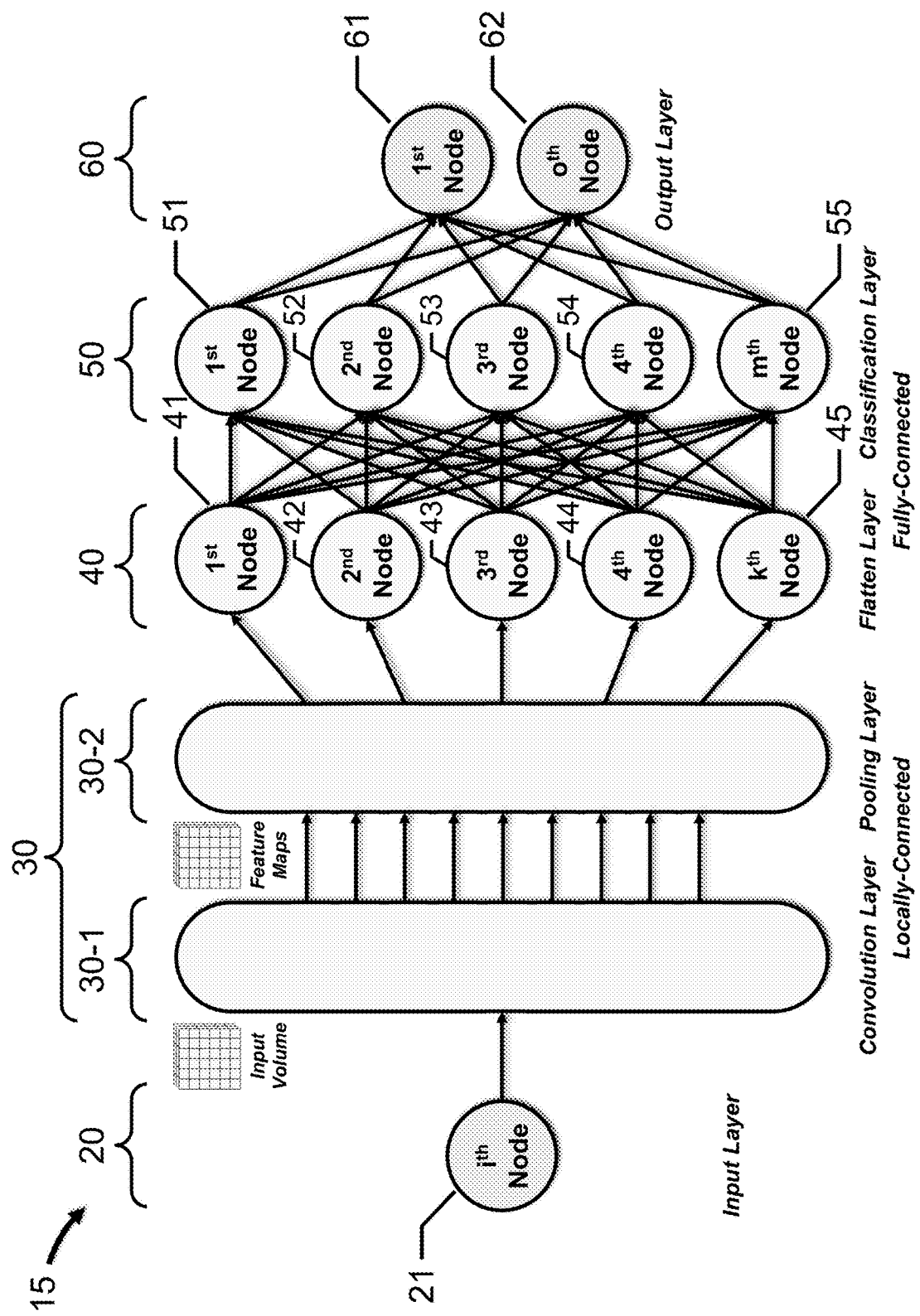
FIG. 2 depicts a convolutional neural network (CNN), in accordance with embodiments of the present disclosure.

FIG. 2 depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3A:
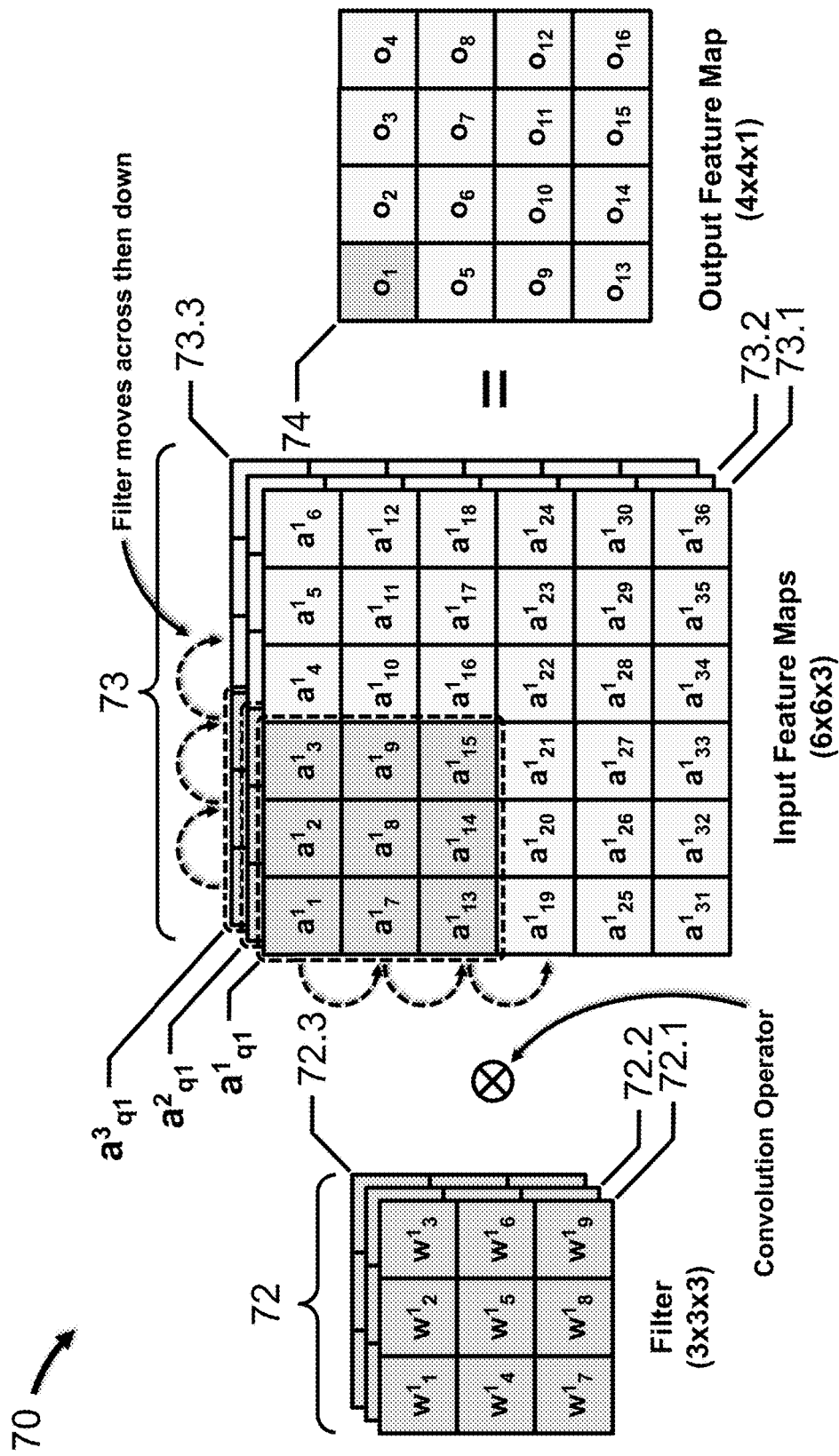
FIG. 3A depicts a convolutional layer calculation for a CNN, in accordance with an embodiment of the present disclosure.

FIG. 3A depicts a convolutional layer calculation 70 for a CNN, in accordance with an embodiment of the present disclosure.

Filter 72 (3×3×3) includes weight matrix 72.1 ($w^1$), weight matrix 72.2 ($w^2$), and weight matrix 72.3 ($w^3$), input feature maps 73 (6×6×3) include input data matrix 73.1, input data matrix 73.2 and input data matrix 73.3, and output feature map 74 (4×4×1) includes an output data matrix. Filter 72 is convolved with input feature maps 73 to produce output feature map 74. In this example, the output data matrix element $o_1$ is the sum of the dot products of filter 72.1 ($w^1$) and the upper left quadrant of input data matrix 73.1 ($a^1_{q1}$), filter 72.2 ($w^2$) and the upper left quadrant of input data matrix 73.2 ($a^2_{q1}$), and filter 72.3 ($w^3$) and the upper left quadrant of input data matrix 73.3 ($a^3_{q1}$).

More particularly, the dot product, i.e., the sum of the element by element multiplication, of filter 72.1 ($w^1$) and the upper left quadrant of input data matrix 73.1 ($a^1_{q1}$) is equal to $w^1_1 \times a^1_1 + w^1_2 \times a^1_2 + w^1_3 \times a^1_3 + w^1_4 \times a^1_7 + w^1_5 \times a^1_8 + w^1_6 \times a^1_9 + w^1_7 \times a^1_{13} + w^1_8 \times a^1_{14} + w^1_9 \times a^1_{15}$. The dot products of filter 72.2 ($w^2$) and the upper left quadrant of input data matrix 73.2 ($a^2_{q1}$), and filter 72.3 ($w^3$) and the upper left quadrant of input data matrix 73.3 ($a^3_{q1}$) are calculated in the same manner, i.e., the dot product of filter 72.2 ($w^2$) and the upper left quadrant of input data matrix 73.2 ($a^2_{q1}$) is equal to $w^2_1 \times a^2_1 + w^2_2 \times a^2_2 + w^2_3 \times a^2_3 + w^2_4 \times a^2_7 + w^2_5 \times a^2_8 + w^2_6 \times a^2_9 + w^2_7 \times a^2_{13} + w^2_8 \times a^2_{14} + w^2_9 \times a^2_{15}$, and the dot product of filter 72.3 ($w^3$) and the upper left quadrant of input data matrix 73.3 ($a^3_{q1}$) is equal to $w^3_1 \times a^3_1 + w^3_2 \times a^3_2 + w^3_3 \times a^3_3 + w^3_4 \times a^3_7 + w^3_5 \times a^3_8 + w^3_6 \times a^3_9 + w^3_7 \times a^3_{13} + w^3_8 \times a^3_{14} + w^3_9 \times a^3_{15}$.

Output data matrix element $o_2$ is the sum of the dot products of filter 72.1 ($w^1$) and the next upper quadrant of input data matrix 73.1, filter 72.2 ($w^2$) and the next upper quadrant of input data matrix 73.2, and filter 72.3 ($w^3$) and the next upper quadrant of input data matrix 73.3. The "next" upper quadrant in each input data matrix 73.1, 73.2 and 73.3 has been shifted one column to the right relative to the first upper quadrant. More particularly, the dot product of filter 72.1 ($w^1$) and the next upper quadrant of input data matrix 73.1 is equal to $w^1_1 \times a^1_2 + w^1_2 \times a^1_3 + w^1_3 \times a^1_4 + w^1_4 \times a^1_8 + w^1_5 \times a^1_9 + w^1_6 \times a^1_{10} + w^1_7 \times a^1_{14} + w^1_8 \times a^1_{15} + w^1_9 \times a^1_{16}$. The dot products of filter 72.2 ($w^2$) and the next upper quadrant of input data matrix 73.2, and filter 72.3 ($w^3$) and the next upper quadrant of input data matrix 73.3 are calculated in the same manner, i.e., the dot product of filter 72.2 ($w^2$) and the next upper quadrant of input data matrix 73.2 is equal to $w^2_1 \times a^2_2 + w^2_2 \times a^2_3 + w^2_3 \times a^2_4 + w^2_4 \times a^2_8 + w^2_5 \times a^2_9 + w^2_6 \times a^2_{10} + w^2_7 \times a^2_{14} + w^2_8 \times a^2_{15} + w^2_9 \times a^2_{16}$, and the dot product of filter 72.3 ($w^3$) and the next upper quadrant of input data matrix 73.3 is equal to $w^3_1 \times a^3_2 + w^3_2 \times a^3_3 + w^3_3 \times a^3_4 + w^3_4 \times a^3_8 + w^3_5 \times a^3_9 + w^3_6 \times a^3_{10} + w^3_7 \times a^3_{14} + w^3_8 \times a^3_{15} + w^3_9 \times a^3_{16}$.

Figure 3B:
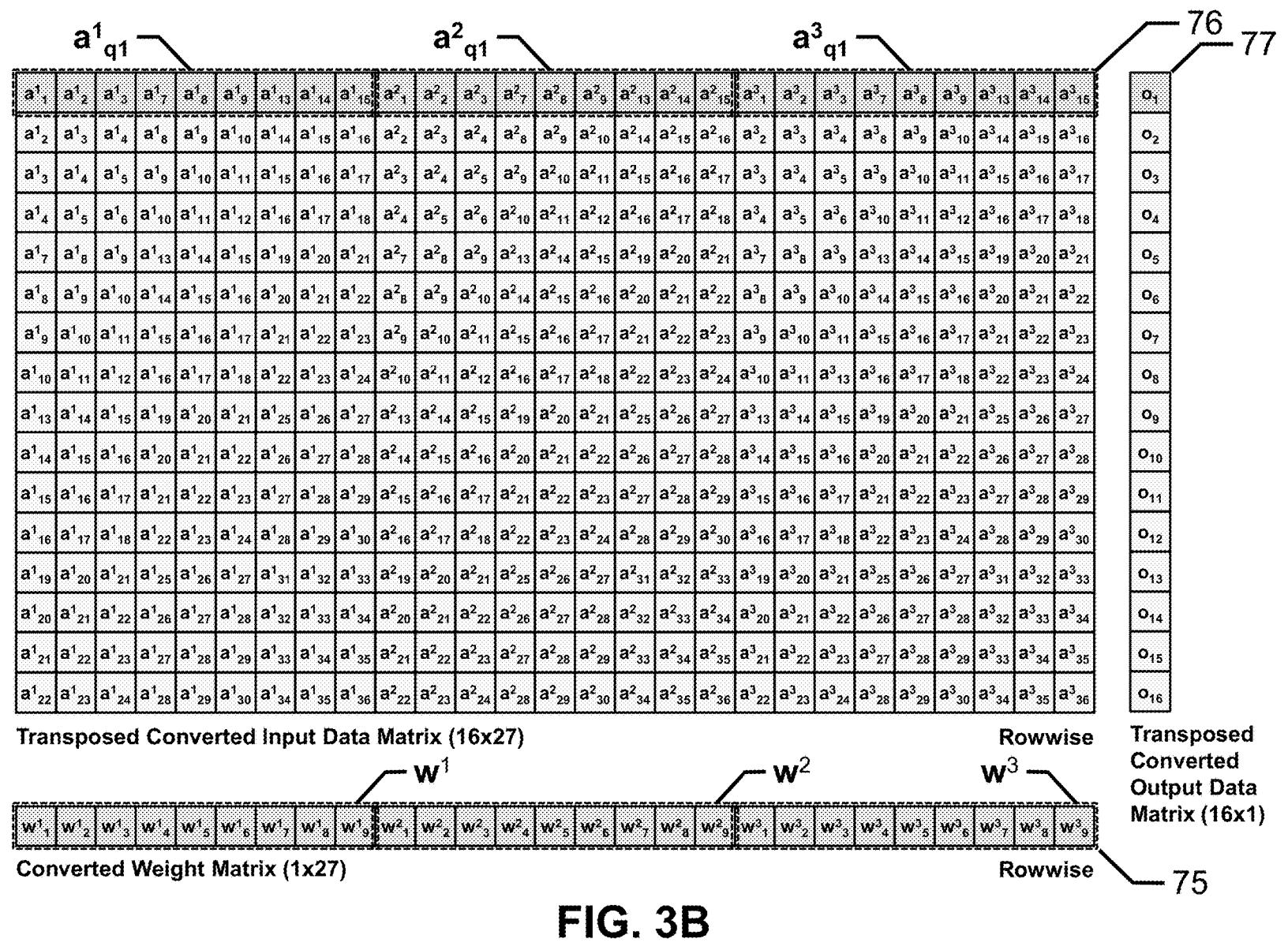
Figure 3C:
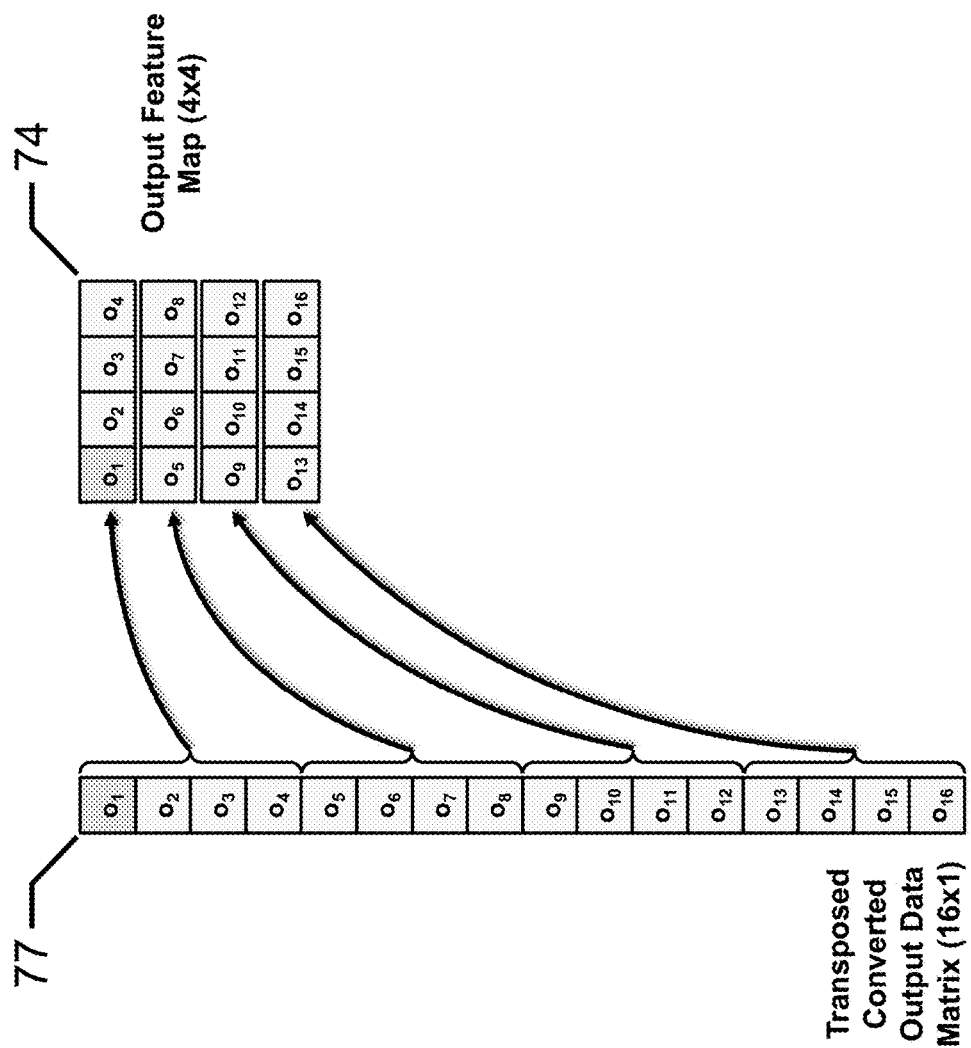

FIGS. 3B and 3C depicts a converted convolutional layer calculation for a CNN, in accordance with an embodiment of the present disclosure.

In one embodiment, the convolutional layer calculations for CNNs executing on central processor units (CPUs), graphics processing units (GPUs), etc., may be converted into generic matrix multiplication (GEMM) operations, which may leverage GEMM-optimized software libraries, or, alternatively, which may be implemented in a dedicated hardware accelerator using a two-dimensional array of MAC units.

Convolution layer calculation 70 is converted into a GEMM operation by converting filter 72 into converted weight matrix 75 (1×27) and input feature maps 73 into converted input data matrix 76 (27×16). After multiplying converted weight matrix 75 and converted input data matrix 76, converted output data matrix 77 (1×16) is then reformed into output feature map 74 (4×4). For ease of illustration, converted input data matrix 76 (27×16) and converted output data matrix 77 (1×16) are depicted in transposed orientations (16×27 and 16×1, respectively) in FIG. 3B.

In this example, converted output data matrix element $o_1$ is the sum of the dot products of the first (i.e., only) row of converted weight matrix 75 and the first column of converted input data matrix 76. As shown in FIG. 3B, the converted weight matrix 75 includes filter 72.1 ($w^1$), filter 72.2 ($w^2$), and filter 72.3 ($w^3$), while the first column of converted input data matrix 76 includes the elements of the upper left quadrant of input data matrix 73.1 ($a^1_{q1}$), the upper left quadrant of input data matrix 73.2 ($a^2_{q1}$), and the upper left quadrant of input data matrix 73.3 ($a^3_{q1}$).

More particularly, the converted output data matrix element $o_1$ is equal to $w^1_1 \times a^1_1 + w^1_2 \times a^1_2 + w^1_3 \times a^1_3 + w^1_4 \times a^1_7 + w^1_5 \times a^1_8 + w^1_6 \times a^1_9 + w^1_7 \times a^1_{13} + w^1_8 \times a^1_{14} + w^1_9 \times a^1_{15} + w^2_1 \times a^2_1 + w^2_2 \times a^2_2 + w^2_3 \times a^2_3 + w^2_4 \times a^2_7 + w^2_5 \times a^2_8 + w^2_6 \times a^2_9 + w^2_7 \times a^2_{13} + w^2_8 \times a^2_{14} + w^2_9 \times a^2_{15} + w^3_1 \times a^3_1 + w^3_2 \times a^3_2 + w^3_3 \times a^3_3 + w^3_4 = a^3_7 + w^3_5 \times a^3_8 + w^3_6 \times a^3_9 + w^3_7 \times a^3_{13} + w^3_8 \times a^3_{14} + w^3_9 \times$ $a^3{}_{15}{}^3{}_9$. The converted output data matrix element $o_1$ is equal to the output data matrix element $o_1$.

Figure 4A:
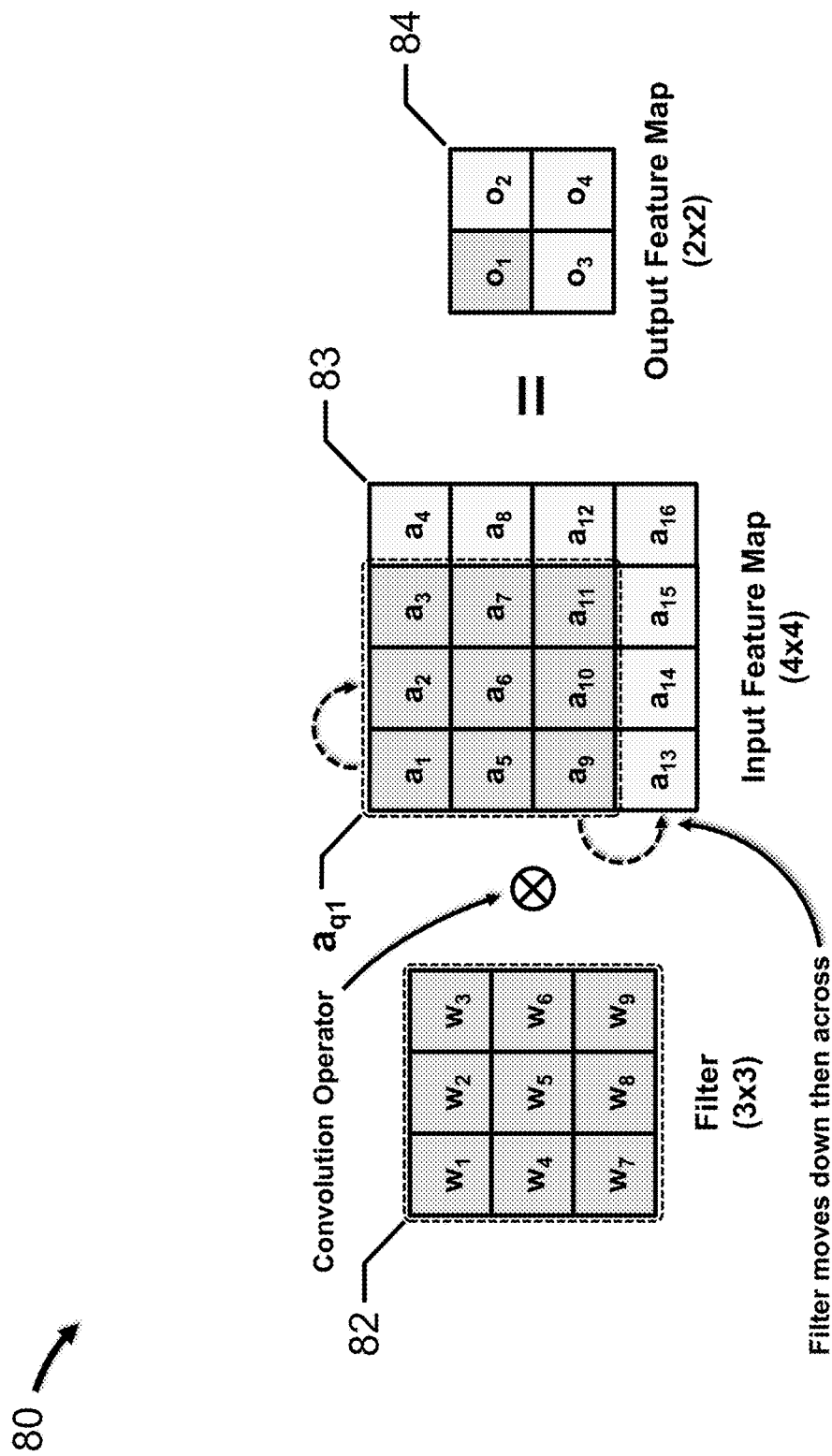
FIG. 4A depicts a convolutional layer calculation for a CNN, in accordance with another embodiment of the present disclosure.

FIG. 4A depicts a convolutional layer calculation 80 for a CNN, in accordance with an embodiment of the present disclosure.

Filter 82 (3×3) includes weight matrix (w), which is convolved with input feature map (IFM) 83 (6×6) to produce output feature map (OFM) 84 (2×2). In this example, the output data matrix element $o_1$ is the dot product of filter 82 (w) and the upper left quadrant of IFM 83 ($a_{q1}$).

More particularly, the dot product, i.e., the sum of the element by element multiplication, of filter 82 (w) and the first (i.e., upper left) quadrant of IFM 83 ($a_{q1}$) is equal to $w_1 \times a_1 + w_2 \times a_2 + w_3 \times a_3 + w_4 \times a_5 + w_5 \times a_6 + w_6 \times a_7 + w_7 \times a_9 + w_8 \times a_{10} + w_9 \times a_{11}$. Output data matrix element $o_3$ is the dot product of filter 82 (w) and the second (i.e., lower left) quadrant of IFM 83. The second quadrant in IFM 83 has been shifted one row down relative to the first quadrant. More particularly, the dot product of filter 82 (w) and the second quadrant of IFM 83 is equal to $w_1 \times a_5 + w_2 \times a_6 + w_3 \times a_7 + w_4 \times a_9 + w_5 \times a_{10} + w_6 \times a_{11} + w_7 \times a_{13} + w_8 \times a_{14} + w_9 \times a_{15}$. Output data matrix element $o_2$ is the dot product of filter 82 (w) and the third (i.e., upper right) quadrant of IFM 83. The third quadrant in IFM 83 has been shifted one column right relative to the first quadrant. More particularly, the dot product of filter 82 (w) and the third quadrant of IFM 83 is equal to $w_1 \times a_2 + w_2 \times a_3 + w_3 \times a_4 + w_4 \times a_6 + w_5 \times a_7 + w_6 \times a_8 + w_7 \times a_{10} + w_8 \times a_{11} + w_9 \times a_{12}$. Output data matrix element $o_4$ is the dot product of filter 82 (w) and the fourth (i.e., lower right) quadrant of IFM 83. The fourth quadrant in IFM 83 has been shifted one row down relative to the third quadrant. More particularly, the dot product of filter 82 (w) and the fourth quadrant of IFM 83 is equal to $w_1 \times a_6 + w_2 \times a_7 + w_3 \times a_8 + w_4 \times a_{10} + w_5 \times a_{11} + w_6 \times a_{12} + w_7 \times a_{14} + w_8 \times a_{15} + w_9 \times a_{16}$.

Figure 4B:
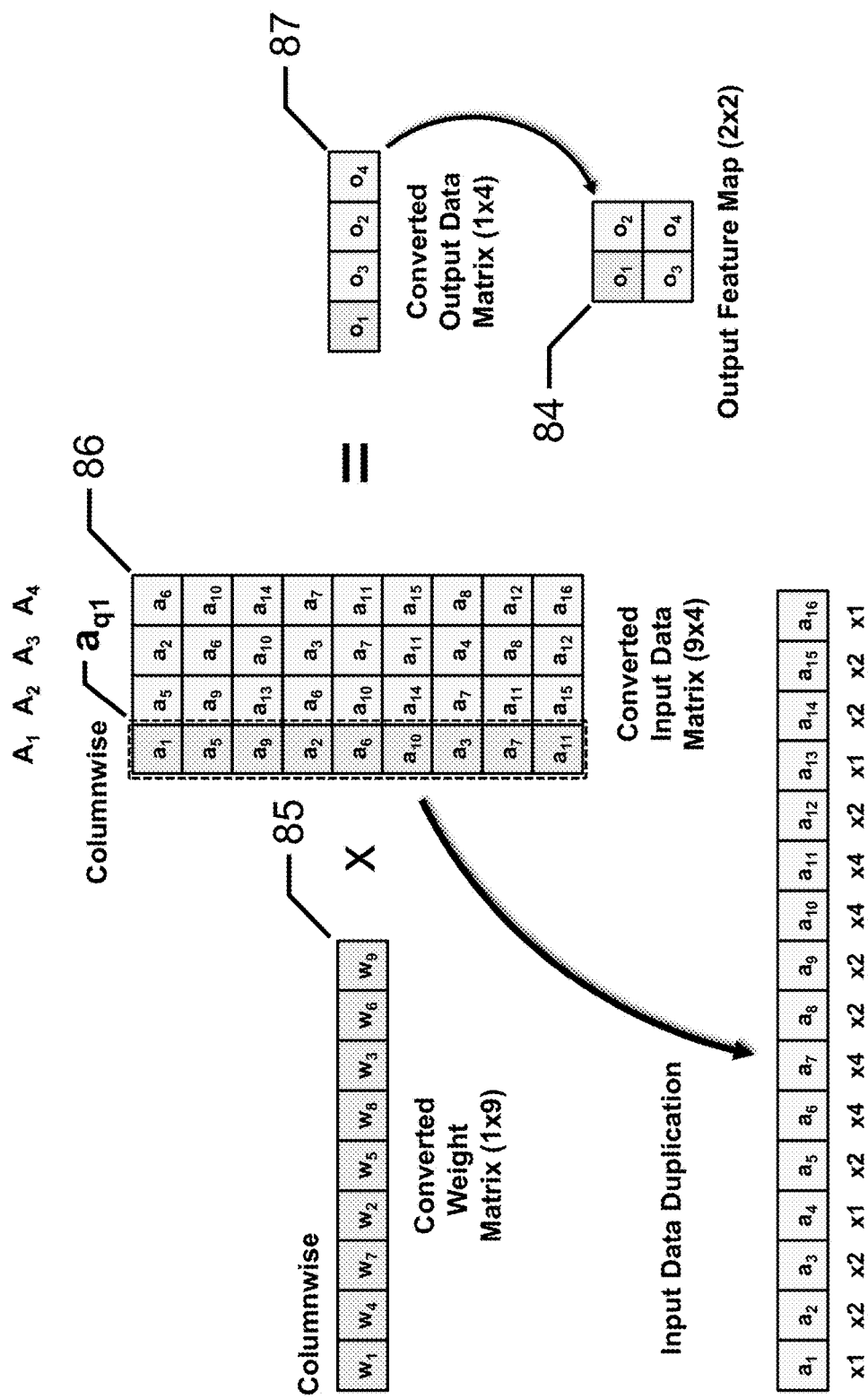
FIG. 4B depicts a converted convolutional layer calculation for a CNN, in accordance with another embodiment of the present disclosure.

FIG. 4B depict a converted convolutional layer calculation for a CNN, in accordance with an embodiment of the present disclosure.

Convolution layer calculation 80 is converted into a GEMM operation by converting filter 82 into converted weight matrix 85 (1×9) and IFM 83 into converted input data matrix 86 (9×4) using, for example, the IM2COL software function. After multiplying converted weight matrix 85 and converted input data matrix 86, converted output data matrix 87 (1×4) is then reformed into output feature map 84 (2×2).

In this example, converted output data matrix element $o_1$ is the sum of the dot products of the first (i.e., only) row of converted weight matrix 85 and the first column of converted input data matrix 86. As shown in FIG. 4B, the converted weight matrix 85 includes filter 82 (w), while the first column of converted input data matrix 86 includes the elements of the upper left quadrant of IFM 83 ($a_{q1}$). Many elements of IFM 83 are duplicated in converted input data matrix 86, i.e., elements $a_2$, $a_3$, $a_5$, $a_8$, $a_9$, $a_{12}$, $a_{14}$ and $a_{15}$ are repeated twice, while elements a6, a7, a10 and a11 are repeated four times.

More particularly, the element $o_1$ of converted output data matrix 87 is equal to $w_1 \times a_1 + w_4 \times a_5 + w_7 \times a_9 + w_2 \times a_2 + w_5 \times a_6 + w_8 \times a_{10} + w_3 \times a_3 + w_6 \times a_7 + w_9 \times a_{11}$, which is the same as element $o_1$ of OFM 84 shown above. The element $o_3$ of converted output data matrix 87 is equal to $w_1 \times a_5 + w_4 \times a_9 + w_7 \times a_{13} + w_2 \times a_6 + w_5 \times a_{10} + w_8 \times a_{14} + w_3 \times a_7 + w_6 \times a_{11} + w_9 \times a_{15}$, which is the same as element $o_3$ of OFM 84 shown above. The element $o_2$ of converted output data matrix 87 is equal to $w_1 \times a_2 + w_4 \times a_6 + w_7 \times a_{10} + w_2 \times a_3 + w_5 \times a_7 + w_8 \times a_{11} + w_3 \times a_4 + w_6 \times a_8 + w_9 \times a_{12}$, which is the same as element $o_2$ of OFM 84 shown above. The element $o_4$ of converted OFM 87 is equal to $w_1 \times a_6 + w_4 \times a_{10} + w_7 \times a_{14} + w_2 \times a_7 + w_5 \times a_{11} + w_8 \times a_{15} + w_3 \times a_8 + w_6 \times a_{12} + w_9 \times a_{16}$, which is the same as element $o_4$ of OFM 84 shown above.

Figure 5:
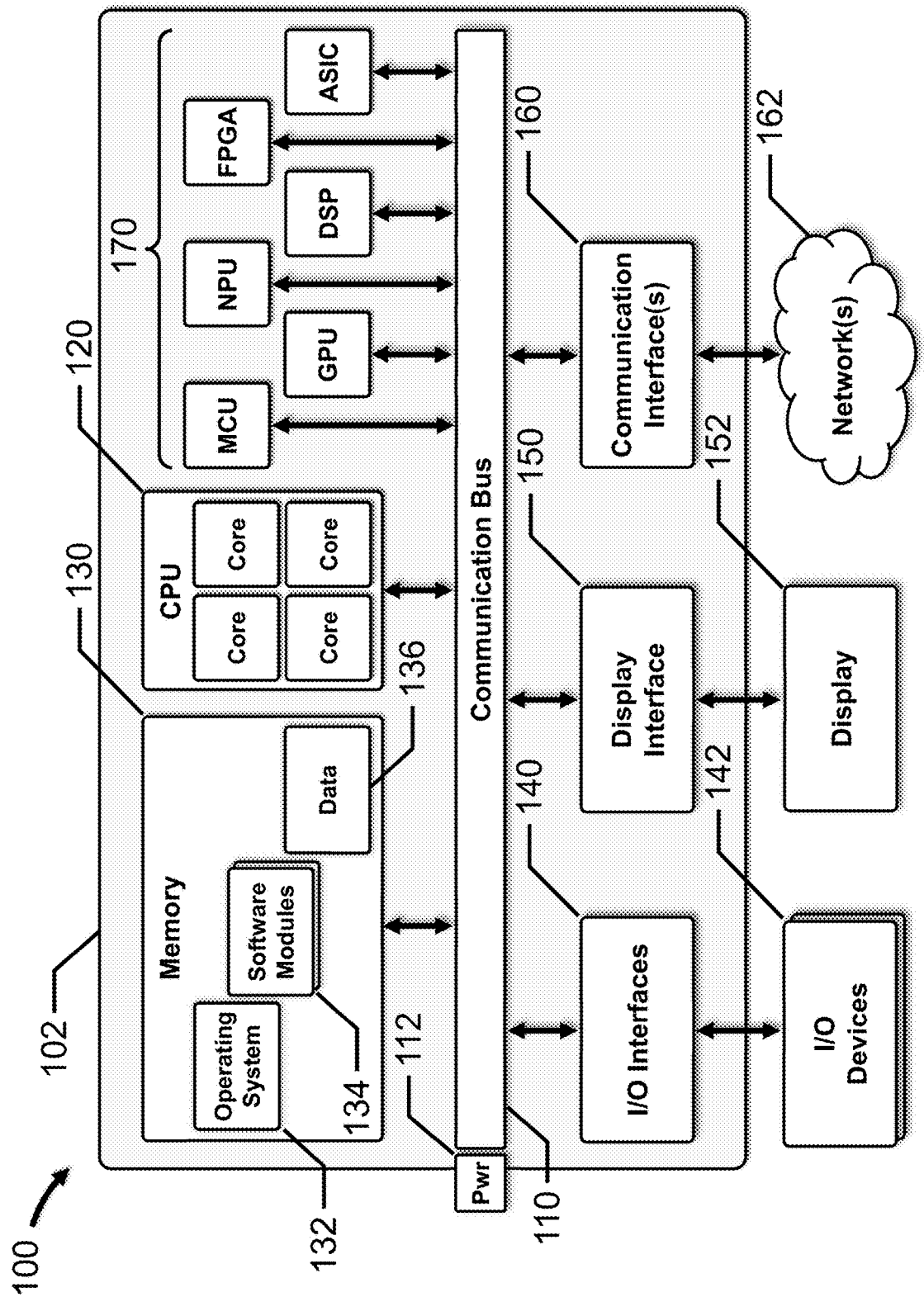
FIG. 5 depicts a block diagram of a system, in accordance with embodiments of the present disclosure.

FIG. 5 depicts a block diagram of system 100, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In some embodiments, certain components of system 100 are implemented as a system-on-chip (SoC) 102; in other embodiments, system 100 may be hosted on a traditional printed circuit board, motherboard, etc.

In certain embodiments, system 100 is an embedded system in which one or more of the components depicted in FIG. 3 are not present, such as, for example, I/O interfaces 140, I/O devices 142, display interface 150, display 152, etc. Additionally, certain components, when present, may be optimized based on various design constraints, such as, for example, power, area, etc., such as, for example, HA 170.

Communication bus 110 is a communication system that transfers data between processor 120, memory 130, I/O interfaces 140, display interface 150, communication interface 160, HAs 170, as well as other components not depicted in FIG. 3. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores as well as various other modules.

In some embodiments, system 100 may include 2 processors 120, each containing multiple processing cores. For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc. In this example, the "big" processing cores include a memory management unit (MMU). In other embodiments, system 100 may be an embedded system that includes a single processor 120 with one or more processing cores, such as, for example, an Arm Cortex-M core. In these embodiments, processor 120 typically includes a memory protection unit (MPU).

In many embodiments, processor 120 may also be configured to execute classification-based machine learning (ML) models, such as, for example, ANNs, DNNs, CNNs, RNNs, SVM, Naïve Bayes, etc. In these embodiments, processor 120 may provide the same functionality as a hardware accelerator, such as HA 170. For example, system 100 may be an embedded system that does not include HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using CNNs, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute ML models, such as, for example, ANNs, CNNs, RNNs, etc., in support of various applications embodied by software modules 134. Generally, HAs 170 include one or more processors, coprocessors, processing engines (PEs), compute engines (CEs), etc., such as, for example, CPUs, GPUs, NPUs (e.g., the ARM ML Processor), DSPs, field programmable gate arrays (FPGAs), application specific integrated circuits (ASICs), controllers, microcontrollers, matrix multiplier circuits, MAC arrays, etc. HAs 170 also include a communications bus interface as well as non-volatile and/or volatile memories, such as, for example, ROM, flash memory, SRAM, DRAM, etc.

In many embodiments, HA 170 receives the ANN model and weights from memory 130 over communication bus 110 for storage in local volatile memory (e.g., SRAM, DRAM, etc.). In other embodiments, HA 170 receives a portion of the ANN model and weights from memory 130 over communication bus 110. In these embodiments, HA 170 determines the instructions needed to execute the ANN model or ANN model portion. In other embodiments, the ANN model (or ANN model portion) simply includes the instructions needed to execute the ANN model (or ANN model portion). In these embodiments, processor 120 determines the instructions needed to execute the ANN model, or, processor 120 divides the ANN model into ANN model portions, and then determines the instructions needed to execute each ANN model portion. The instructions are then provided to HA 170 as the ANN model or ANN model portion.

In further embodiments, HA 170 may store ANN models, instructions and weights in non-volatile memory. In certain embodiments, the ANN model may be directly implemented in hardware using PEs, CEs, matrix multiplier units, MAC arrays, etc. Generally, HA 170 receives input data from memory 130 over communication bus 110, and transmit output data to memory 130 over communication bus 110. In certain embodiments, the input data may be associated with a layer (or portion of a layer) of the ANN model, and the output data from that layer (or portion of that layer) may be transmitted to memory 130 over communication bus 110.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

Figure 6:
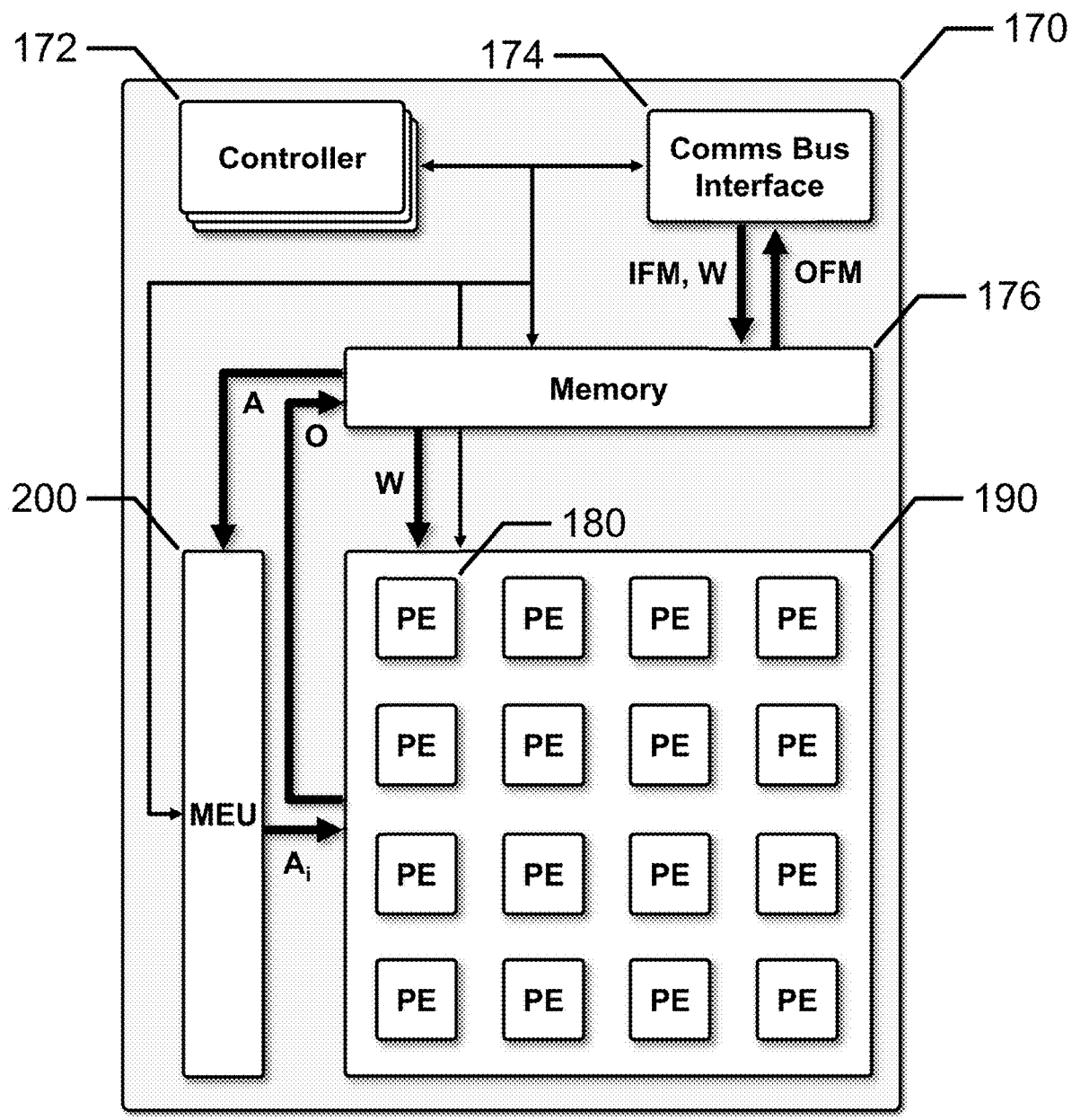
FIG. 6 depicts a hardware accelerator, in accordance with embodiments of the present disclosure.

FIG. 6 depicts a block diagram of hardware accelerator 170, in accordance with embodiments of the present disclosure.

HA 170 includes one or more controllers 172, communication bus interface 174, local memory 176 (e.g., SRAM, DRAM, etc.), one or more PEs 180, and one or more matrix expansion units (MEUs) 200. Controller 172 is coupled to communication bus interface 174, local memory 176, PEs 180 and MEU 200, and generally controls the components, functions, data flow, etc., of HA 170. In certain embodiments, controller 172 is an Arm Cortex-M33 microcontroller (MCU); other processors, microprocessors, controllers, microcontrollers, etc., are also contemplated.

Memory 176 is coupled to communication bus interface 174, PEs 180 and MEU 200, and receives IFM data and weights from memory 130 via communication bus interface 174, provides the IFM data (activations, "A") to MEU 200, provides associated weights ("W") to PEs 180, and receives OFM data (dot products, "O") from PEs 180. Memory 176 may send the OFM data back to memory 130 via communication bus interface 174, after which new IFM data and associated weights are received from memory 130 via communication bus interface 174. Alternatively, memory 176 may send the OFM data back to MEU 200 as new IFM data (new activations, "A"), and may send new associated weights ("W") to PEs 180.

MEU 200 is coupled to memory 176 and PEs 180, and converts or expands the original version of the IFM data (activations, "A") to an IM2COL version, and provides the expanded IFM data (expanded activation sequences, "$A_i$") to PEs 180, as discussed in detail below.

Generally, each PE 180 may execute at least a portion of an ANN model using at least a portion of the ANN weights. In many embodiments, each PE 180 is a MAC unit that includes an 8-bit integer (INT8) multiplier and a 32-bit integer (INT32) accumulator register. Other types of PEs 180 are also contemplated. In many embodiments, a number of PEs 180 may be arranged as systolic array (SA) 190, such as, for example, 4 PEs, 8 PEs, 16 PEs (depicted in FIG. 6), 32 PEs, etc. In many embodiments, PEs 180 may be interconnected using registers that provide temporary storage for weight and/or activation operands as they cycle through SA 190. In certain embodiments, PEs 180 may be interconnected by a NoC using a ring topology, a star topology, a mesh topology, etc. In other embodiments, PEs 180 may be interconnected using a cross-bar switch, direct connections, etc.

Figure 7:
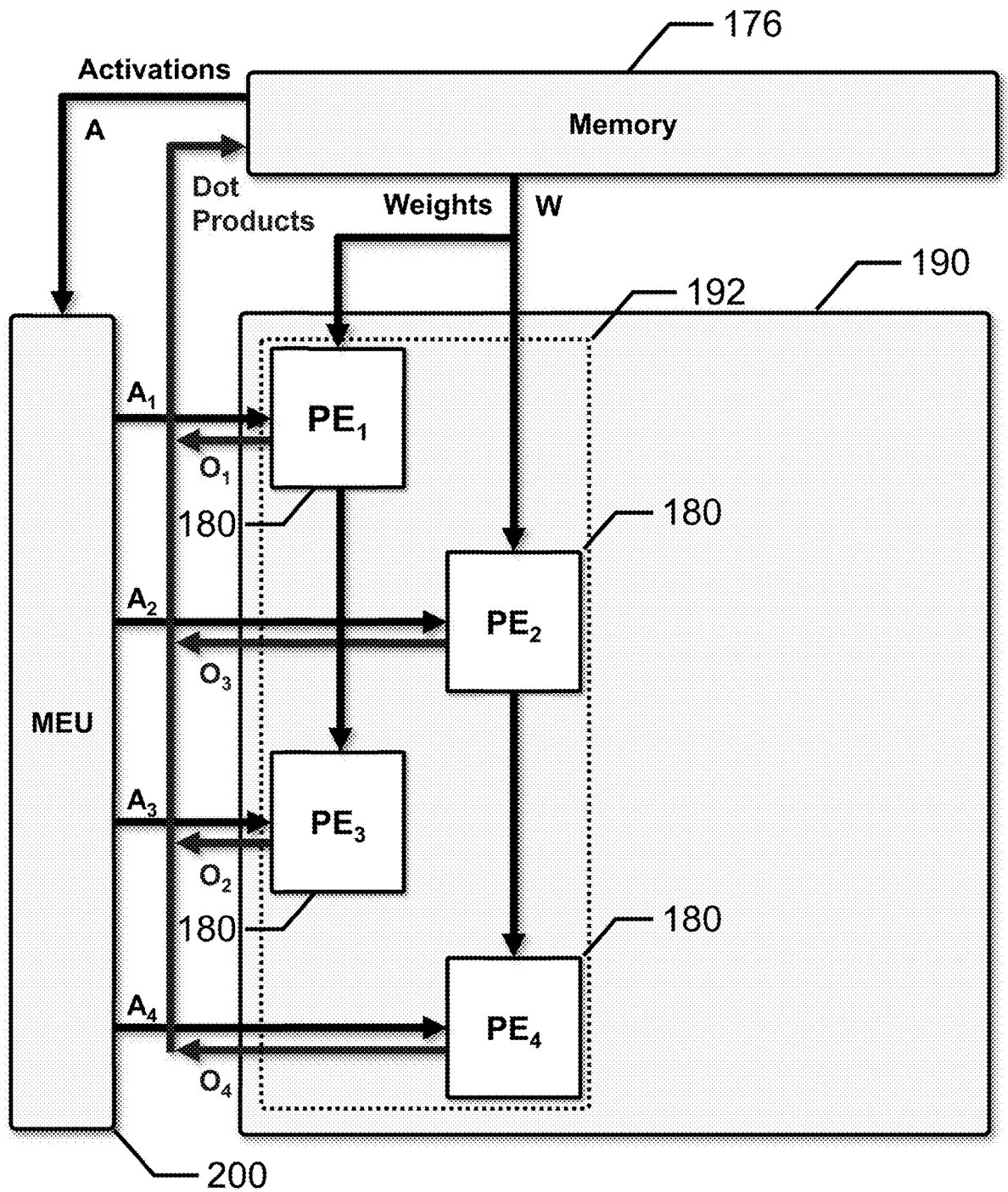
FIG. 7 depicts a portion of a hardware accelerator, in accordance with an embodiment of the present disclosure.

FIG. 7 depicts a portion of hardware accelerator 170, in accordance with an embodiment of the present disclosure.

In this embodiment, SA 190 includes four PEs 180 (i.e., $PE_1$, $PE_2$, $PE_3$ and $PE_4$) coupled to memory 176 and MEU 200. Within SA 190, $PE_3$ is coupled to $PE_1$, and $PE_4$ is coupled to $PE_2$. In other embodiments, $PE_1$, $PE_2$, $PE_3$ and $PE_4$ may form a systolic subarray (SSA) 192 within SA 190. In these embodiments, SA 190 includes additional PEs 180, such as, for example, 4 additional PEs 180, 12 additional PEs 180, 24 additional PEs 180, etc., which may form additional SSAs 192; each additional SSA 192 may be coupled to an additional MEU 200. Generally, the number of PEs 180 within each SSA 192 and the number of expanded activation sequences ("Ai") that are provided by each MEU 200 depend on the underlying matrix dimensions of the IFM data and the weights. For example, the embodiment depicted in FIG. 7 reflects the matrix dimensions of filter 82 (3×3), IFM 83 (4×4) and OFM 84 (2×2) depicted in FIG. 4A.

With respect to the weights, $PE_1$ and $PE_2$ receive the sequence of weights (W), one weight per processing cycle. $PE_3$ receives the sequence of weights (W) from $PE_1$, one weight per processing cycle after the initial weight is delayed or skewed by one processing cycle. Similarly, $PE_4$ receives the sequence of weights (W) from $PE_2$, one weight per processing cycle after the initial weight is delayed or skewed by one processing cycle.

With respect to the activations, MEU 200 reads the elements of a sequence of activations (A) from memory 176, and generates four unique expanded activation sequences ($A_1$, $A_2$, $A_3$ and $A_4$), as described below. Each PE 180 receives one of the unique activation sequences ($A_1$, $A_2$, $A_3$ or $A_4$) from MEU 200. $PE_1$ receives the expanded activation sequence $A_1$, one expanded activation per processing cycle. $PE_2$ receives the expanded activation sequence $A_2$, one expanded activation per processing cycle. $PE_3$ receives the expanded activation sequence $A_3$, one expanded activation per processing cycle after the initial expanded activation is delayed or skewed by one processing cycle. $PE_4$ receives the expanded activation sequence $A_4$, one expanded activation per processing cycle after the initial expanded activation is delayed or skewed by one processing cycle.

Generally, $PE_1$, $PE_2$, $PE_3$ and $PE_4$ calculate and then output respective dot products $O_1$, $O_2$, $O_3$ and $O_4$ based on the weights (W) and the respective sequences of expanded activations ($A_1$, $A_2$, $A_3$ and $A_4$).

After the last weight (W) is received from memory 176 and the last element of expanded activation sequence ($A_1$) is received from MEU 200, $PE_1$ calculates the final dot product ($O_1$), and outputs the final dot product ($O_1$) to memory 176. Similarly, after the last weight (W) is received from memory 176 and the last element of expanded activation sequence ($A_2$) is received from MEU 200, $PE_2$ calculates the final dot product ($O_2$), and outputs the final dot product ($O_2$) to memory 176. After the last weight (W) is received from $PE_1$ and the last element of expanded activation sequence ($A_3$) is received from MEU 200, $PE_3$ calculates the final dot product ($O_3$), and outputs the final dot product ($O_3$) to memory 176, delayed or skewed by one processing cycle. Similarly, after the last weight (W) is received from $PE_2$ and the last element of expanded activation sequence ($A_4$) is received from MEU 200, $PE_4$ calculates the final dot product ($O_4$), and outputs the final dot product ($O_4$) to memory 176, delayed or skewed by one processing cycle. The process then repeats for the next sequences of weights (W), activations (A) and expanded activation sequences ($A_1$, $A_2$, $A_3$ and $A_4$).

Figure 8:
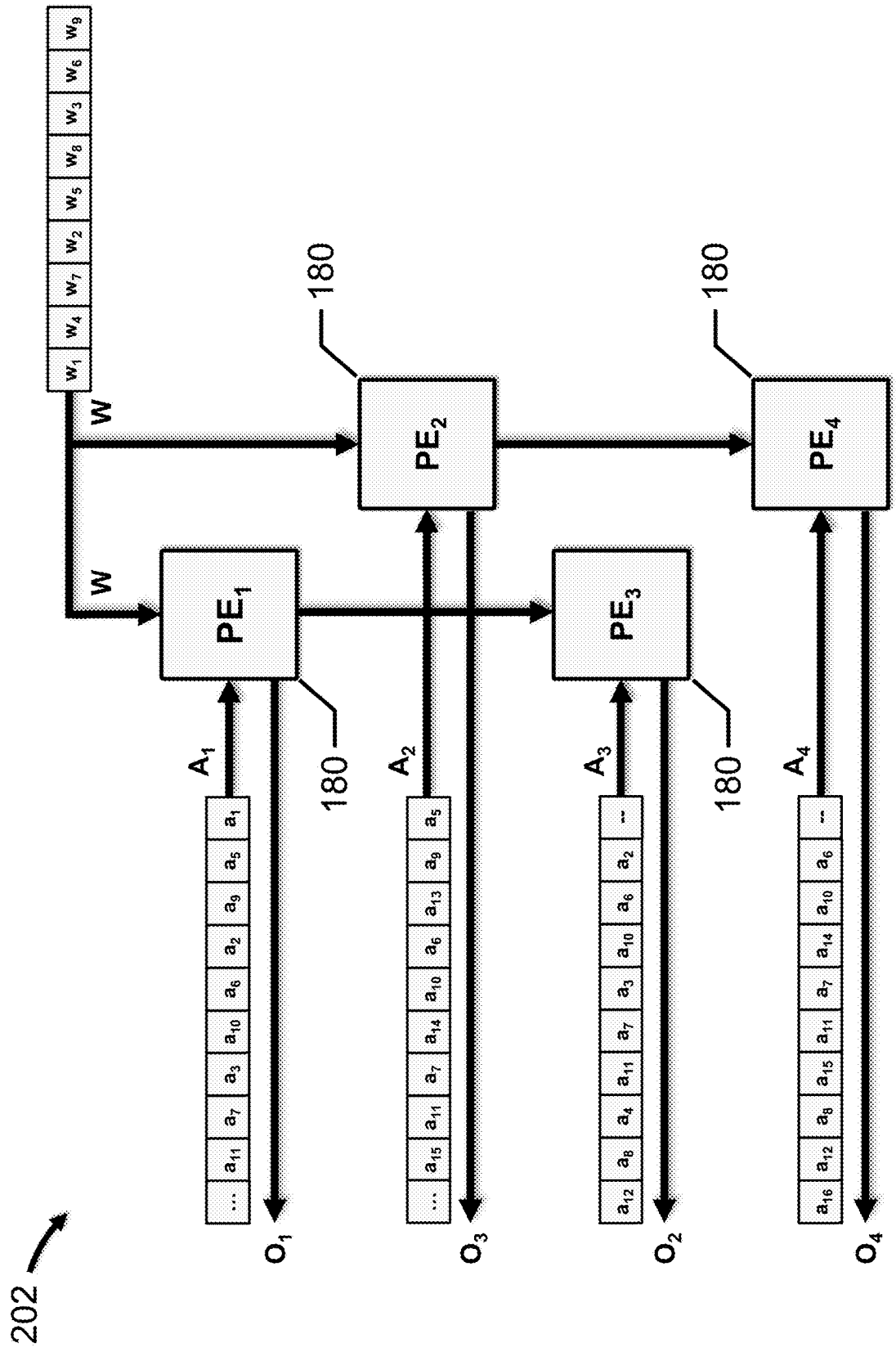
FIG. 8 depicts a data flow diagram for the portion of a hardware accelerator depicted in FIG. 7, in accordance with an embodiment of the present disclosure.

FIG. 8 depicts data flow diagram 202 for the portion of a hardware accelerator depicted in FIG. 7, in accordance with an embodiment of the present disclosure.

Prior to processing data, $PE_1$, $PE_2$, $PE_3$ and $PE_4$ are reset or initialized, which includes setting the value of the accumulation registers to zero. Once data processing has commenced, $PE_1$ and $PE_2$ may be reset or initialized at the beginning of the first processing cycle, while $PE_3$ and $PE_4$ may be reset or initialized at the beginning of the second processing cycle.

After MEU 200 is reset, the first processing cycle begins. The sequence of weights provided by memory 176 ($w_1$ to $w_9$) is based on converted weight matrix 85 (one weight per cycle, read left to right), and the sequences of expanded activations provided by MEU 200 ($A_1$, $A_2$, $A_3$ and $A_4$) are based on converted input data matrix 86 (one row per cycle, each row read left to right), as depicted in FIG. 4B.

During the first processing cycle, memory 176 provides $w_1$ to $PE_1$ and $PE_2$, and MEU 200 provides element $a_1$ (from $A_1$) to $PE_1$, and element $a_5$ (from $A_2$) to $PE_2$. $PE_1$ multiplies $w_1$ and $a_1$ and then accumulates the result, while $PE_2$ multiples $w_1$ and $a_5$ and then accumulates the result.

During the second processing cycle, memory 176 provides $w_4$ to $PE_1$ and $PE_2$, $PE_1$ provides $w_1$ to $PE_3$, $PE_2$ provides $w_1$ to $PE_4$, and MEU 200 provides element $a_5$ (from $A_1$) to $PE_1$, element $a_6$ (from $A_2$) to $PE_2$, element $a_2$ (from $A_3$) to $PE_3$, and element $a_{10}$ (from $A_4$) to $PE_4$. $PE_1$ multiplies $w_4$ and $a_5$ and then accumulates the result, $PE_2$ multiples $w_4$ and $a_9$ and then accumulates the result, $PE_3$ multiplies $w_1$ and $a_2$ and then accumulates the result, and $PE_4$ multiplies $w_1$ and $a_6$ and then accumulates the result.

During the third processing cycle, memory 176 provides $w_7$ to $PE_1$ and $PE_2$, $PE_1$ provides $w_4$ to $PE_3$, $PE_2$ provides $w_4$ to $PE_4$, and MEU 200 provides element $a_9$ (from $A_1$) to $PE_1$, element $a_{13}$ (from $A_2$) to $PE_2$, element $a_6$ (from $A_3$) to $PE_3$, and element $a_{10}$ (from $A_4$) to $PE_4$. $PE_1$ multiplies $w_7$ and $a_9$ and then accumulates the result, $PE_2$ multiples $w_7$ and $a_{13}$ and then accumulates the result, $PE_3$ multiplies $w_4$ and $a_6$ and then accumulates the result, and $PE_4$ multiplies $w_4$ and $a_{10}$ and then accumulates the result.

During the fourth processing cycle, memory 176 provides $w_2$ to $PE_1$ and $PE_2$, $PE_1$ provides $w_7$ to $PE_3$, $PE_2$ provides $w_7$ to $PE_4$, and MEU 200 provides element $a_2$ (from $A_1$) to $PE_1$, element $a_6$ (from $A_2$) to $PE_2$, element $a_{10}$ (from $A_3$) to $PE_3$, and element $a_{14}$ (from $A_4$) to $PE_4$. $PE_1$ multiplies $w_2$ and $a_2$ and then accumulates the result, $PE_2$ multiples $w_2$ and $a_6$ and then accumulates the result, $PE_3$ multiplies $w_7$ and an and then accumulates the result, and $PE_4$ multiplies $w_7$ and $a_{14}$ and then accumulates the result.

During the fifth processing cycle, memory 176 provides $w_5$ to $PE_1$ and $PE_2$, $PE_1$ provides $w_2$ to $PE_3$, $PE_2$ provides $w_2$ to $PE_4$, and MEU 200 provides element $a_6$ (from $A_1$) to $PE_1$, element $a_{10}$ (from $A_2$) to $PE_2$, element $a_3$ (from $A_3$) to $PE_3$, and element $a_7$ (from $A_4$) to $PE_4$. $PE_1$ multiplies $w_5$ and $a_6$ and then accumulates the result, $PE_2$ multiples $w_5$ and $a_{10}$ and then accumulates the result, $PE_3$ multiplies $w_2$ and $a_3$ and then accumulates the result, and $PE_4$ multiplies $w_2$ and $a_7$ and then accumulates the result.

During the sixth processing cycle, memory 176 provides $w_8$ to $PE_1$ and $PE_2$, $PE_1$ provides $w_5$ to $PE_3$, $PE_2$ provides $w_5$ to $PE_4$, and MEU 200 provides element $a_{10}$ (from $A_1$) to $PE_1$, element $a_{14}$ (from $A_2$) to $PE_2$, element $a_7$ (from $A_3$) to $PE_3$, and element $a_{11}$ (from $A_4$) to $PE_4$. $PE_1$ multiplies $w_8$ and $a_{10}$ and then accumulates the result, $PE_2$ multiples $w_8$ and $a_{14}$ and then accumulates the result, $PE_3$ multiplies $w_5$ and $a_7$ and then accumulates the result, and $PE_4$ multiplies $w_5$ and $a_{11}$ and then accumulates the result.

During the seventh processing cycle, memory 176 provides $w_3$ to $PE_1$ and $PE_2$, $PE_1$ provides $w_8$ to $PE_3$, $PE_2$ provides $w_8$ to $PE_4$, and MEU 200 provides element $a_3$ (from $A_1$) to $PE_1$, element $a_7$ (from $A_2$) to $PE_2$, element $a_{11}$ (from $A_3$) to $PE_3$, and element $a_{15}$ (from $A_4$) to $PE_4$. $PE_1$ multiplies $w_3$ and $a_3$ and then accumulates the result, $PE_2$ multiples $w_3$ and $a_7$ and then accumulates the result, $PE_3$ multiplies $w_8$ and $a_{11}$ and then accumulates the result, and $PE_4$ multiplies $w_8$ and $a_{15}$ and then accumulates the result.

During the eighth processing cycle, memory 176 provides $w_6$ to $PE_1$ and $PE_2$, $PE_1$ provides $w_3$ to $PE_3$, $PE_2$ provides $w_3$ to $PE_4$, and MEU 200 provides element $a_7$ (from $A_1$) to $PE_1$, element $a_{11}$ (from $A_2$) to $PE_2$, element $a_4$ (from $A_3$) to $PE_3$, and element $a_8$ (from $A_4$) to $PE_4$. $PE_1$ multiplies $w_6$ and $a_7$ and then accumulates the result, $PE_2$ multiples $w_6$ and $a_{11}$ and then accumulates the result, $PE_3$ multiplies $w_3$ and $a_4$ and then accumulates the result, and $PE_4$ multiplies $w_3$ and $a_8$ and then accumulates the result.

During the ninth processing cycle, memory 176 provides $w_9$ to $PE_1$ and $PE_2$, $PE_1$ provides $w_6$ to $PE_3$, $PE_2$ provides $w_6$ to $PE_4$, and MEU 200 provides element $a_{11}$ (from $A_1$) to $PE_1$, element $a_{15}$ (from $A_2$) to $PE_2$, element $a_8$ (from $A_3$) to $PE_3$, and element $a_{12}$ (from $A_4$) to $PE_4$. $PE_1$ multiplies $w_9$ and $a_{11}$ and then accumulates the result, $PE_2$ multiples $w_9$ and $a_{15}$ and then accumulates the result, $PE_3$ multiplies $w_6$ and $a_8$ and then accumulates the result, and $PE_4$ multiplies $w_6$ and $a_{12}$ and then accumulates the result. At the end of the ninth processing cycle, $PE_1$ outputs the value in the accumulation register as dot product $O_1$, $PE_2$ outputs the value in the accumulation register as dot product $O_3$.

During the next processing cycle (which may be the first processing cycle for the next set of weights and expanded activation sequences), $PE_1$ provides $w_9$ to $PE_3$, $PE_2$ provides $w_9$ to $PE_4$, and MEU 200 provides element $a_{12}$ (from $A_3$) to $PE_3$, and element $a_{16}$ (from $A_4$) to $PE_4$. $PE_3$ multiplies $w_9$ and $a_{12}$ and then accumulates the result, and $PE_4$ multiplies $w_9$ and $a_{16}$ and then accumulates the result. At the end of this processing cycle, $PE_3$ outputs the value in the accumulation register as dot product $O_2$, $PE_4$ outputs the value in the accumulation register as dot product $O_4$.

In summary, dot product $O_1$ is equal to $w_1 \times a_1 + w_4 \times a_5 + w_7 \times a_9 + w_2 \times a_2 + w_5 \times a_6 + w_8 \times a_{10} + w_3 \times a_3 + w_6 \times a_7 + w_9 \times a_{11}$, which is the same as element $o_1$ of converted output data matrix 87 and element $o_1$ of OFM 84 shown above. Dot product $O_3$ is equal to $w_1 \times a_5 + w_4 \times a_9 + w_7 \times a_{13} + w_2 \times a_6 + w_5 \times a_{10} + w_8 \times a_{14} + w_3 \times a_7 + w_6 \times a_{11} + w_9 \times a_{15}$, which is the same as element $o_3$ of converted output data matrix 87 and element $o_3$ of OFM 84 shown above. Dot product $O_2$ is equal to $w_1 \times a_2 + w_4 \times a_6 + w_7 \times a_{10} + w_2 \times a_3 + w_5 \times a_7 + w_8 \times a_{11} + w_3 \times a_4 + w_6 \times a_8 + w_9 \times a_{12}$, which is the same as element $o_2$ of converted output data matrix 87 and element $o_2$ of OFM 84 shown above. Dot product $O_4$ is equal to $w_1 \times a_6 + w_4 \times a_{10} + w_7 \times a_{14} + w_2 \times a_7 + w_5 \times a_{11} + w_8 \times a_{15} + w_3 \times a_8 + w_6 \times a_{12} + w_9 \times a_{16}$, which is the same as element $o_4$ of converted output data matrix 87 and element $o_4$ of OFM 84 shown above.

Figure 9:
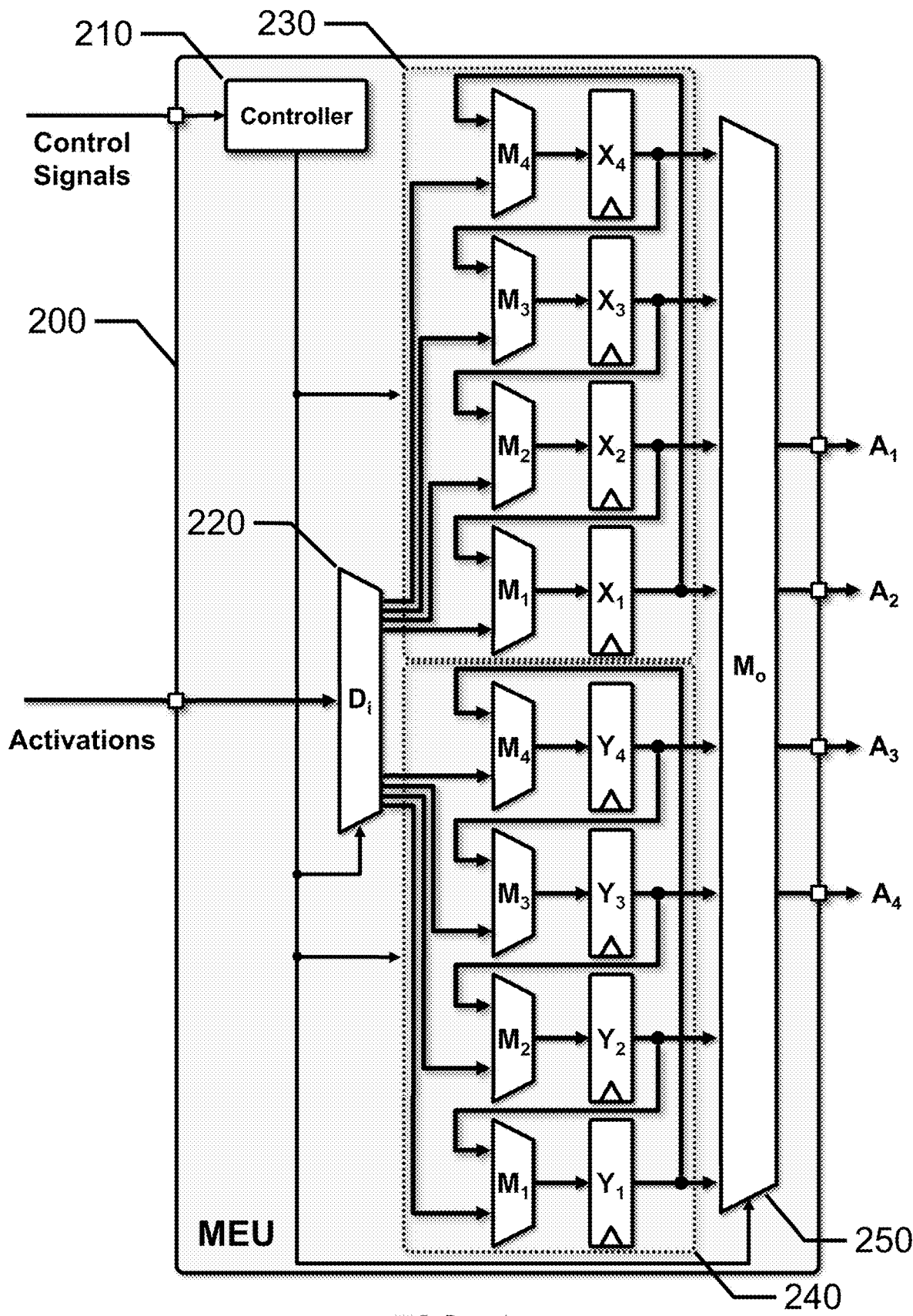
FIG. 9 depicts a matrix expansion unit, in accordance with an embodiment of the present disclosure.

FIG. 9 depicts matrix expansion unit 200, in accordance with an embodiment of the present disclosure.

MEU 200 includes controller 210, input data selector 220, register set 230, register set 240, and output data selector 250.

Controller 210 generally controls the components, data flow, etc., of MEU 200 in response to control signals received from controller 172. Controller 210 is coupled to input data selector 220, register set 230, register set 240 and output data selector 250. With respect to register set 230, controller 210 is coupled to data selectors 230-$M_1$, 230-$M_2$, 230-$M_3$, 230-$M_4$ and registers 230-$X_1$, 230-$X_2$, 230-$X_3$, 230-$X_4$ (not shown for clarity). With respect to register set 240, controller 210 is coupled to data selectors 240-$M_1$, 240-$M_2$, 240-$M_3$, 240-$M_4$, and registers 240-$Y_1$, 240-$Y_2$, 240-$Y_3$, 240-$Y_4$ (not shown for clarity).

Input data selector 220 receives activation data from memory 176, and, based on a control signal from controller 210, sends the activation data to registers 230-$X_1$, 230-$X_2$, 230-$X_3$, 230-$X_4$, or registers 240-$Y_1$, 240-$Y_2$, 240-$Y_3$, 240-$Y_4$. The activation data are received in a columnwise format. Generally, input data selector 220 is a single input, multiple output switch such as, for example, a demultiplexer, etc. In this embodiment, input data selector 220 has one input coupled to memory 176, and eight outputs respectively coupled to a respective first input of data selectors 230-$M_1$, 230-$M_2$, 230-$M_3$, 230-$M_4$, 240-$M_1$, 240-$M_2$, 240-$M_3$ and 240-$M_4$.

Register set 230 generally includes a plurality of data selectors and a plurality of registers. Register set 230 is coupled to input data selector 220 and output data selector 250. In this embodiment, register set 230 includes four data selectors 230-$M_1$, 230-$M_2$, 230-$M_3$ and 230-$M_4$, and four registers 230-$X_1$, 230-$X_2$, 230-$X_3$ and 230-$X_4$, arranged in a shift-loop. Generally, data selectors 230-$M_1$, 230-$M_2$, 230-$M_3$, 230-$M_4$, are a multiple input, single output switch such as, for example, a multiplexer, etc. In this embodiment, each data selector 230-$M_1$, 230-$M_2$, 230-$M_3$, 230-$M_4$ has two inputs and one output. Data selector 230-$M_1$ has a first input coupled to a respective output of input data selector 220, a second input coupled to register 230-$X_2$, and an output coupled to register 230-$X_1$. Data selector 230-$M_2$ has a first input coupled to a respective output of input data selector 220, a second input coupled to register 230-$X_3$, and an output coupled to register 230-$X_2$. Data selector 230-$M_3$ has a first input coupled to a respective output of input data selector 220, a second input coupled to register 230-$X_4$, and an output coupled to register 230-$X_3$. Data selector 230-$M_4$ has a first input coupled to a respective output of input data selector 220, a second input coupled to register 230-$X_1$, and an output coupled to register $230\text{-}X_4$. Registers $230\text{-}X_1$, $230\text{-}X_2$, $230\text{-}X_3$ and $230\text{-}X_4$ are coupled to respective inputs of output data selector 250.

Register set 240 generally includes a plurality of data selectors and a plurality of registers. Register set 240 is coupled to input data selector 220 and output data selector 250. In this embodiment, register set 240 includes four data selectors $240\text{-}M_1$, $240\text{-}M_2$, $240\text{-}M_3$ and $240\text{-}M_4$, and four registers $240\text{-}Y_1$, $240\text{-}Y_2$, $240\text{-}Y_3$ and $240\text{-}Y_4$, arranged in a shift-loop. Generally, data selectors $240\text{-}M_1$, $240\text{-}M_2$, $240\text{-}M_3$, $240\text{-}M_4$, are a multiple input, single output switch such as, for example, a multiplexer, etc. In this embodiment, each data selector $240\text{-}M_1$, $240\text{-}M_2$, $240\text{-}M_3$, $240\text{-}M_4$ has two inputs and one output. Data selector $240\text{-}M_1$ has a first input coupled to a respective output of input data selector 220, a second input coupled to register $240\text{-}Y_2$ and an output coupled to register $240\text{-}Y_1$. Data selector $240\text{-}M_2$ has a first input coupled to a respective output of input data selector 220, a second input coupled to register $240\text{-}Y_3$ and an output coupled to register $240\text{-}Y_2$. Data selector $240\text{-}M_3$ has a first input coupled to a respective output of input data selector 220, a second input coupled to register $240\text{-}Y_4$ and an output coupled to register $240\text{-}Y_3$. Data selector $240\text{-}M_4$ has a first input coupled to a respective output of input data selector 220, a second input coupled to register $240\text{-}Y_1$ and an output coupled to register $240\text{-}Y_4$. Registers $240\text{-}Y_1$, $240\text{-}Y_2$, $240\text{-}Y_3$ and $240\text{-}Y_4$ are coupled to respective inputs of output data selector 250.

Output data selector 250 receives expanded activation data from register set 230 and register set 240, and sends the expanded activation data to a plurality of PEs 180 based on a control signal from controller 210. The expanded activation data are sent in a rowwise format. Generally, output data selector 250 is a multiple input, multiple output switch such as, for example, a multiplexer, etc. In this embodiment, output data selector 250 has eight inputs respectively coupled to registers $230\text{-}X_1$, $230\text{-}X_2$, $230\text{-}X_3$, $230\text{-}X_4$, $240\text{-}Y_1$, $240\text{-}Y_2$, $240\text{-}Y_3$ and $240\text{-}Y_4$, and four outputs respectively coupled to four PEs 180, i.e., $PE_1$, $PE_2$, $PE_3$ and $PE_4$.

Operation of MEU 200 will be explained with reference to FIGS. 10A, 10B and 11A to 11F.

FIG. 10A depicts state machine transition diagram 300 for matrix expansion unit 200, in accordance with an embodiment of the present disclosure.

State machine transition diagram 300 depicts nine unique states, i.e., S1, S2, S3, S4, S5, S6, S7, S8 and S9. Each state is associated with a particular processing cycle described above, i.e., S1 is associated with the first processing cycle, S2 is associated with the second processing cycle, etc., and each state only transitions to the succeeding state, i.e., S1 transitions to S2 at the completion of the first processing cycle, S2 transitions to S3 at the completion of the second processing cycle, etc. After a reset, S1 is entered and the first processing cycle begins. At the completion of the ninth processing cycle, S9 transitions to S1 without a reset in order to output the final expanded activations for expanded activation sequences $A_3$ and $A_4$.

Generally, controller 210 manages the state transitions by sending control signals to change the input and/or output settings of the data selectors of MEU 200.

FIG. 10B depicts output table 310 for matrix expansion unit 200, in accordance with an embodiment of the present disclosure.

MEU output table 310 lists the registers $230\text{-}X_1$, $230\text{-}X_2$, $230\text{-}X_3$, $230\text{-}X_4$, $240\text{-}Y_1$, $240\text{-}Y_2$, $240\text{-}Y_3$, $240\text{-}Y_4$ that are selected by output data selector 250 to provide the output from MEU 200. Each state provides four register values, one value for each expanded activation sequence $A_1$, $A_2$, $A_3$ and $A_4$.

During operation in state S1, controller 210 sends a control signal to output data selector 250 to select register $230\text{-}X_1$ to output a first element of $A_1$, select register $230\text{-}X_2$ to output a first element of $A_2$, select register $240\text{-}Y_1$ to output an element of $A_3$, and select register $240\text{-}Y_2$ to output an element of $A_4$. Due to the delayed or skewed processing described above, the outputs provided by registers $240\text{-}Y_1$ and $240\text{-}Y_2$ will be either zero (after a reset) or the last elements of $A_3$ and $A_4$ from a preceding set of weights and expanded activations.

During operation in state S2, controller 210 sends a control signal to output data selector 250 to select register $230\text{-}X_1$ to output the second element of $A_1$, select register $230\text{-}X_2$ to output the second element of $A_2$, select register $240\text{-}Y_1$ to output the first element of $A_3$, and select register $240\text{-}Y_2$ to output the first element of $A_4$.

During operation in state S3, controller 210 sends a control signal to output data selector 250 to select register $230\text{-}X_1$ to output the third element of $A_1$, select register $230\text{-}X_2$ to output the third element of $A_2$, select register $240\text{-}Y_1$ to output the second element of $A_3$, and select register $240\text{-}Y_2$ to output the second element of $A_4$. The configuration of output data selector 250 is the same as for states S1, S2 and S3.

During operation in state S4, controller 210 sends a control signal to output data selector 250 to select register $240\text{-}Y_3$ to output the fourth element of $A_1$, select register $240\text{-}Y_4$ to output the fourth element of $A_2$, select register $240\text{-}Y_1$ to output the third element of $A_3$, and select register $240\text{-}Y_2$ to output the third element of $A_4$.

During operation in state S5, controller 210 sends a control signal to output data selector 250 to select register $240\text{-}Y_3$ to output the fifth element of $A_1$, select register $240\text{-}Y_4$ to output the fifth element of $A_2$, select register $230\text{-}X_1$ to output the fourth element of $A_3$, and select register $230\text{-}X_2$ to output the fourth element of $A_4$.

During operation in state S6, controller 210 sends a control signal to output data selector 250 to select register $240\text{-}Y_3$ to output the sixth element of $A_1$, select register $240\text{-}Y_4$ to output the sixth element of $A_2$, select register $230\text{-}X_1$ to output the fifth element of $A_3$, and select register $230\text{-}X_2$ to output the fifth element of $A_4$. The configuration of output data selector 250 is the same as for states S5 and S6.

During operation in state S7, controller 210 sends a control signal to output data selector 250 to select register $230\text{-}X_3$ to output the seventh element of $A_1$, select register $230\text{-}X_4$ to output the seventh element of $A_2$, select register $230\text{-}X_1$ to output the sixth element of $A_3$, and select register $230\text{-}X_2$ to output the sixth element of $A_4$.

During operation in state S8, controller 210 sends a control signal to output data selector 250 to select register $230\text{-}X_3$ to output the eighth element of $A_1$, select register $230\text{-}X_4$ to output the eighth element of $A_2$, select register $240\text{-}Y_1$ to output the seventh element of $A_3$, and select register $240\text{-}Y_2$ to output the seventh element of $A_4$.

During operation in state S9, controller 210 sends a control signal to output data selector 250 to select register $230\text{-}X_3$ to output the ninth element of $A_1$, select register $230\text{-}X_4$ to output the ninth element of $A_2$, select register $240\text{-}Y_1$ to output the eighth element of $A_3$, and select register $240\text{-}Y_2$ to output the eighth element of $A_4$. The configuration of output data selector 250 is the same as for states S8 and S9.

During operation in state S1 following state S9 (i.e., the beginning of the next set of weights and expanded activations), the outputs provided by registers 240-$Y_1$ and 240-$Y_2$ will be the ninth elements of $A_3$ and $A_4$, respectively.

FIGS. 11A to 11F depict state table 320 for matrix expansion unit 200, in accordance with an embodiment of the present disclosure.

MEU state table 320 depicts the activation values $a_1$ to $a_{16}$ stored in each register for states S1 to S9 based on the embodiments of IFM 83 and converted input data matrix 86 depicted in FIGS. 4A and 4B. States S1 to S9 are followed by states S1 and S2 of the next IFM data sequence (i.e., activation values $b_1$ to $b_{16}$).

Prior to entering state S1 for the first time, controller 210 performs a reset operation in response to a reset control signal received from controller 172. During the reset operation, controller 210 reset the values stored in registers 230-$X_1$, 230-$X_2$, 230-$X_3$, 230-$X_4$, 240-$Y_1$, 240-$Y_2$, 240-$Y_3$ and 240-$Y_4$ to zero. In some embodiments, controller 210 then transitions to state S1, while in other embodiments, controller 210 waits until a start or state transition control signal is received from controller 172 before transitioning to state S1.

FIG. 11A identifies the activation values loaded into each register during states S1, S2, S5 and S8, and the general operation of the shift loop for register set 230 and the shift loop for register set 240.

During operation in state S1, first column data of IFM 83 are loaded into registers 230-$X_1$, 230-$X_2$, 230-$X_3$, 230-$X_4$ of register set 230. During operation in state S2, second column data of IFM 83 are loaded into registers 240-$Y_1$, 240-$Y_2$, 240-$Y_3$ and 240-$Y_4$ of register set 240. During operation in state S5, third column data of IFM 83 are loaded into registers 230-$X_1$, 230-$X_2$, 230-$X_3$, 230-$X_4$ of register set 230. During operation in state S8, fourth column data of IFM 83 are loaded into registers 240-$Y_1$, 240-$Y_2$, 240-$Y_3$ and 240-$Y_4$ of register set 240. These data load operations are discussed in more detail below.

The shift loop for register set 230 operates during states S2, S3, S4, S6, S7, S8 and S9. During operation in each of these states, the values stored in registers 230-$X_1$, 230-$X_2$, 230-$X_3$, 230-$X_4$ are shifted or rotated by one register in a closed loop manner. More particularly, the value stored in register 230-$X_4$ is provided to and stored in register 230-$X_3$, the value stored in register 230-$X_3$ is provided to and stored in register 230-$X_2$, the value stored in register 230-$X_2$ is provided to and stored in register 230-$X_1$, and the value stored in register 230-$X_1$ is provided to and stored in register 230-$X_4$. These data shift operations are discussed in more detail below.

The shift loop for register set 240 operates during states S1, S3, S4, S5, S6, S7 and S9. During operation in each of these states, the values stored in registers 240-$Y_1$, 240-$Y_2$, 240-$Y_3$ and 240-$Y_4$ are shifted or rotated by one register in a closed loop manner. More particularly, the value stored in register 240-$Y_4$ is provided to and stored in register 240-$Y_3$, the value stored in register 240-$Y_3$ is provided to and stored in register 240-$Y_2$, the value stored in register 240-$Y_2$ is provided to and stored in register 240-$Y_1$, and the value stored in register 240-$Y_1$ is provided to and stored in register 240-$Y_4$. These data shift operations are discussed in more detail below.

FIG. 11B highlights the registers that output activation values for each expanded activation sequence $A_1$, $A_2$, $A_3$ and $A_4$ during each state S1 to S9. These registers are listed in MEU output table 310 (FIG. 10B).

FIG. 11C identifies the registers that output the activation values for expanded activation sequence $A_1$, i.e., $a_1$, $a_5$, $a_9$, $a_2$, $a_6$, $a_{10}$, $a_3$, $a_7$ and $a_{11}$, FIG. 11D identifies the registers that output the activation values for expanded activation sequence $A_2$, i.e., $a_5$, $a_9$, $a_{13}$, $a_6$, $a_{10}$, $a_{14}$, $a_7$, $a_{11}$ and $a_{15}$, FIG. 11E identifies the registers that output the activation values for expanded activation sequence $A_3$, i.e., $a_2$, $a_6$, $a_{10}$, $a_3$, $a_7$, $a_{11}$, $a_4$, $a_8$ and $a_{12}$, and FIG. 11F identifies the registers that output the activation values for expanded activation sequence $A_4$, i.e., $a_6$, $a_{10}$, $a_{14}$, $a_7$, $a_{11}$, $a_{15}$, $a_8$, $a_{12}$ and $a_{16}$.

During operation in state S1, controller 210 cooperates with controller 172 to store first column data of IFM 83 into registers 230-$X_1$, 230-$X_1$, 230-$X_1$ and 230-$X_1$ of register set 230. In one embodiment, controller 210 receives a control signal from controller 172 indicating that the first activation value (i.e., $a_1$) is available for storage in register 230-$X_1$, and, in response, sends a control signal to input data selector 220 to select the output line coupled to 230-$X_1$, sends a control signal to data selector 230-$M_1$ to select the first input, and sends a control signal to register 230-$X_1$ to load or store the first activation value presented to its input. In certain embodiments, controller 210 sends a data ready signal to control 172 after the first activation has been loaded; in other embodiments, controller 172 simply waits until a predetermined time period has elapsed.

The remaining registers are loaded in a similar manner. Controller 210 then receives a control signal from controller 172 indicating that the second activation value (i.e., $a_5$) is available for storage in register 230-$X_2$, and, in response, sends a control signal to input data selector 220 to select the output line coupled to 230-$X_2$, sends a control signal to data selector 230-$M_2$ to select the first input, and sends a control signal to register 230-$X_2$ to load or store the second activation value presented to its input.

Controller 210 then receives a control signal from controller 172 indicating that the third activation value (i.e., $a_9$) is available for storage in register 230-$X_3$, and, in response, sends a control signal to input data selector 220 to select the output line coupled to 230-$X_3$, sends a control signal to data selector 230-$M_3$ to select the first input, and sends a control signal to register 230-$X_3$ to load or store the third activation value presented to its input.

Controller 210 then receives a control signal from controller 172 indicating that the fourth activation value (i.e., $a_{13}$) is available for storage in register 230-$X_4$, and, in response, sends a control signal to input data selector 220 to select the output line coupled to 230-$X_4$, sends a control signal to data selector 230-$M_4$ to select the first input, and sends a control signal to register 230-$X_4$ to load or store the fourth activation value presented to its input.

Also during operation in state S1, controller 210 operates the shift loop for register set 240 in which the values stored in registers 240-$Y_1$, 240-$Y_2$, 240-$Y_3$ and 240-$Y_4$ are shifted or rotated by one register in a closed loop manner. More particularly, controller 210 sends control signals to data selectors 240-$M_1$, 240-$M_2$, 240-$M_3$ and 240-$M_4$ to select their respective first inputs, sends control signals to registers 240-$Y_1$, 240-$Y_2$, 240-$Y_3$ and 240-$Y_4$ to latch their respective stored values onto their outputs, and then sends control signals to registers 240-$Y_1$, 240-$Y_2$, 240-$Y_3$ and 240-$Y_4$ to load or store the values presented to their respective inputs. In this embodiment, each register 240-$Y_1$, 240-$Y_2$, 240-$Y_3$ and 240-$Y_4$ has an output that latches the stored value so that a new value presented to its input may be stored at the same time.

Finally, during operation in state S1, controller 210 send a control signal to output data selector 250 to select the registers to output the appropriate elements of each expanded activation sequence $A_1$, $A_2$, $A_3$ and $A_4$, as described above.

State S5 operates in the same manner as state S1, loading the third column data of IFM 83 into registers 230-$X_1$, 230-$X_2$, 230-$X_3$ and 230-$X_4$ of register set 230, operating the shift loop of register set 240, and outputting the appropriate elements of each expanded activation sequence $A_1$, $A_2$, $A_3$ and $A_4$.

During operation in state S2, controller 210 cooperates with controller 172 to store second column data of IFM 83 into registers 240-$Y_1$, 240-$Y_2$, 240-$Y_3$ and 240-$Y_4$ of register set 240. In one embodiment, controller 210 receives a control signal from controller 172 indicating that the first activation value (i.e., $a_2$) is available for storage in register 240-$Y_1$, and, in response, sends a control signal to input data selector 220 to select the output line coupled to 240-$Y_1$, sends a control signal to data selector 240-$M_1$ to select the first input, and sends a control signal to register 240-$Y_1$ to load or store the first activation value presented to its input. In certain embodiments, controller 210 sends a data ready signal to control 172 after the first activation has been loaded; in other embodiments, controller 172 simply waits until a predetermined time period has elapsed.

The remaining registers are loaded in a similar manner. Controller 210 then receives a control signal from controller 172 indicating that the second activation value (i.e., $a_6$) is available for storage in register 240-$Y_2$, and, in response, sends a control signal to input data selector 220 to select the output line coupled to 240-$Y_2$, sends a control signal to data selector 240-$M_2$ to select the first input, and sends a control signal to register 240-$Y_2$ to load or store the second activation value presented to its input.

Controller 210 then receives a control signal from controller 172 indicating that the third activation value (i.e., $a_{10}$) is available for storage in register 240-$Y_3$, and, in response, sends a control signal to input data selector 220 to select the output line coupled to 240-$Y_3$, sends a control signal to data selector 240-$M_3$ to select the first input, and sends a control signal to register 240-$Y_3$ to load or store the third activation value presented to its input.

Controller 210 then receives a control signal from controller 172 indicating that the fourth activation value (i.e., $a_{14}$) is available for storage in register 240-$Y_4$, and, in response, sends a control signal to input data selector 220 to select the output line coupled to 240-$Y_4$, sends a control signal to data selector 240-$M_4$ to select the first input, and sends a control signal to register 240-$Y_4$ to load or store the fourth activation value presented to its input.

During operation in state S2, controller 210 also operates the shift loop for register set 230 in which the values stored in registers 230-$X_1$, 230-$X_2$, 230-$X_3$ and 230-$X_4$ are shifted or rotated by one register in a closed loop manner. More particularly, controller 210 sends control signals to data selectors 230-$M_1$, 230-$M_2$, 230-$M_3$ and 230-$M_4$ to select their respective first inputs, sends control signals to registers 230-$X_1$, 230-$X_2$, 230-$X_3$ and 230-$X_4$ to latch their respective stored values onto their outputs, and then sends control signals to registers 230-$X_1$, 230-$X_2$, 230-$X_3$ and 230-$X_4$ to load or store the values presented to their respective inputs. In this embodiment, each register 230-$X_1$, 230-$X_2$, 230-$X_3$ and 230-$X_4$ has an output that latches the stored value so that a new value presented to its input may be stored at the same time.

For example, at the end of operation in state S1, register 230-$X_1$ stores the value $a_1$, register 230-$X_2$ stores the value $a_5$, register 230-$X_3$ stores the value $a_9$, and register 230-$X_4$ stores the value $a_{13}$. During the shift loop operation for register set 230, the value $a_1$ is shifted or rotated from register 230-$X_1$ to register 230-$X_4$, the value $a_5$ is shifted or rotated from register 230-$X_2$ to register 230-$X_1$, the value $a_9$ is shifted or rotated from register 230-$X_3$ to register 230-$X_2$, and the value $a_{13}$ is shifted or rotated from register 230-$X_4$ to register 230-$X_3$.

Finally, during operation in state S2, controller 210 send a control signal to output data selector 250 to select the registers to output the appropriate elements of each expanded activation sequence $A_1$, $A_2$, $A_3$ and $A_4$, as described above.

State S8 operates in the same manner as state S2, loading the fourth column data of IFM 83 into registers 240-$Y_1$, 240-$Y_2$, 240-$Y_3$ and 240-$Y_4$ of register set 240, operating the shift loop of register set 230, and outputting the appropriate elements of each expanded activation sequence $A_1$, $A_2$, $A_3$ and $A_4$.

During operation in states S3, S6 and S7, controller 210 operates the shift loop for register set 230 and register set 240, and sends a control signal to output data selector 250 to output the appropriate elements of each expanded activation sequence $A_1$, $A_2$, $A_3$ and $A_4$. No column data of IFM 83 are loaded into register set 230 or register set 240 during operation of these states.

Other embodiments are also contemplated by the present disclosure.

Figure 12:
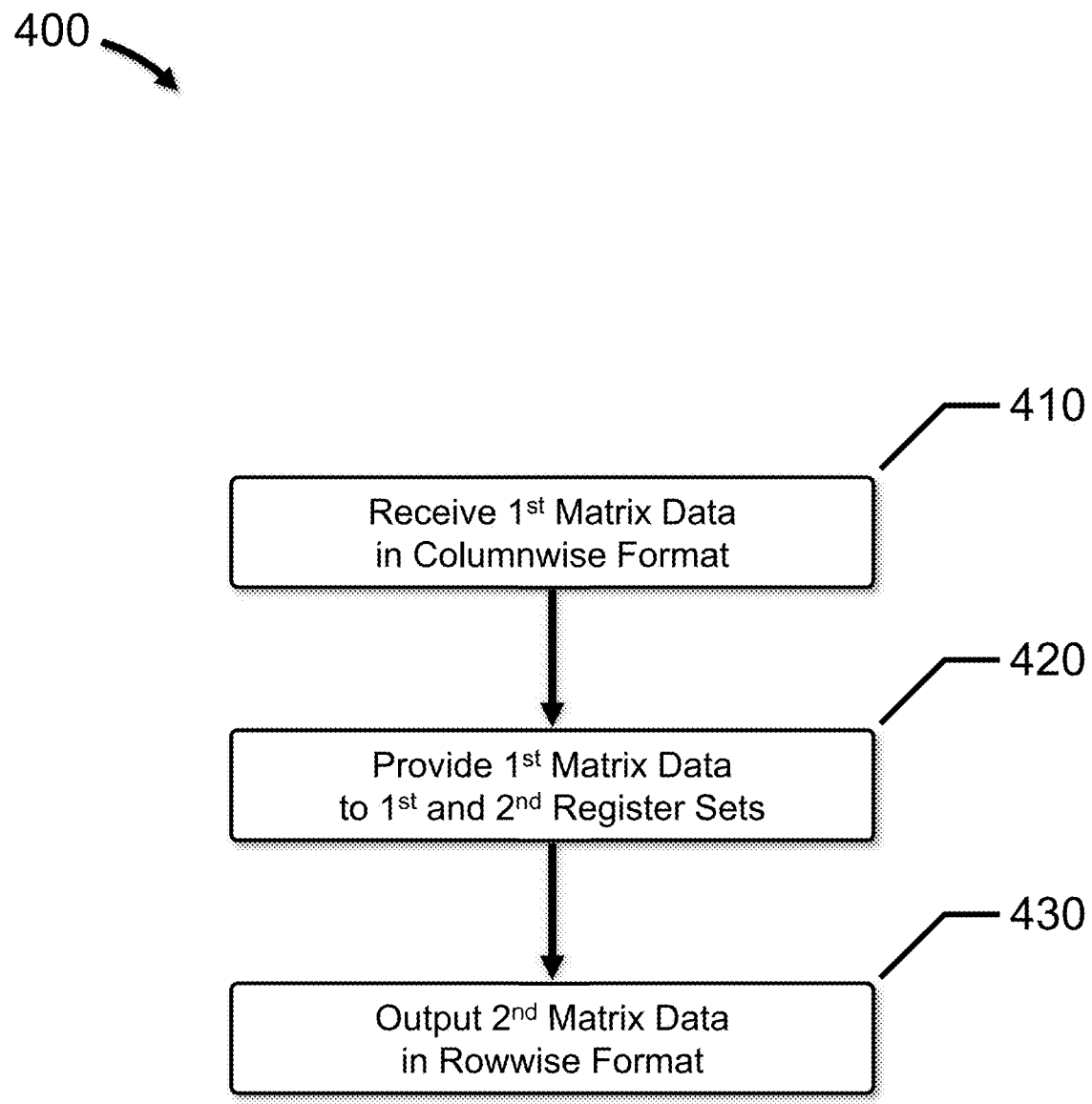
FIG. 12 depicts a flow diagram functionality for expanding a matrix, in accordance with an embodiment of the present disclosure.

FIG. 12 depicts a flow diagram 400 presenting functionality for expanding a matrix, in accordance with embodiments of the present disclosure.

At 410, an input data selector receives first matrix data in a columnwise format.

At 420, the input data selector provides the first matrix data to a first register set and a second register set. The first register set includes a plurality of data selectors and a plurality of registers arranged in a first shift loop. The second register set includes a plurality of data selectors and a plurality of registers arranged in a second shift loop.

At 430, an output data selector, coupled to the first register set and the second register set, outputs second matrix data in a rowwise format.

Embodiments of the present disclosure advantageously provide a matrix expansion unit that efficiently implements the IM2COL software function in hardware. The matrix expansion unit is disposed inline between the memory and the CPU, specialized processor, hardware accelerator processing engine, etc., and converts the original version of the IFM matrix to an IM2COL version. The matrix expansion unit advantageously reduces the memory footprint to that of the native convolution operation, reduces the memory bandwidth required for data movement, which increases the power efficiency at the system level, and takes advantage of the compute regularity of matrix multiplication, which can be more readily optimized in hardware.

The embodiments described above and summarized below are combinable.

In one embodiment, a matrix expansion unit includes an input data selector, a first register set, a second register set, and an output data selector. The input data selector is configured to receive first matrix data in a columnwise format. The first register set is coupled to the input data selector, and includes a plurality of data selectors and a plurality of registers arranged in a first shift loop. The second register set is coupled to the data selector, and includes a plurality of data selectors and a plurality of registers arranged in a second shift loop. The output data selector is coupled to the first register set and the second register set, and is configured to output second matrix data in a rowwise format.

In another embodiment of the hardware accelerator, the hardware accelerator further includes a communication bus interface configured to receive at least a portion of an ANN model with ANN weights, and input data, and transmit output data; and a controller, coupled to the communication bus interface and the memory, configured to extract the first matrix data from the input data, where the memory is further configured to store the portion of the ANN model, the ANN weights, the input data and the output data, and the CE includes a plurality of multiply-and-accumulate (MAC) units.

In another embodiment of the hardware accelerator, the ANN model is a convolutional neural network (CNN) model that includes an input layer, at least one convolutional layer, a fully connected layer and an output layer.

In another embodiment of the hardware accelerator, the first register set includes r data selectors and r registers, each data selector having a first input coupled to an output of the input data selector, a second input coupled to a preceding register in the first shift loop and an output coupled to an associated register.

In another embodiment of the hardware accelerator, each register in the first shift loop is coupled to the output of the associated data selector and to the second input of a following data selector in the first shift loop.

In another embodiment of the hardware accelerator, the second register set includes r data selectors and r registers, each data selector having a first input coupled to an output of the input data selector, a second input coupled to a preceding register in the second shift loop and an output coupled to an associated register.

In another embodiment of the hardware accelerator, each register in the second shift loop is coupled to the output of the associated data selector and to the second input of a following data selector in the second shift loop.

In another embodiment of the hardware accelerator, the input data selector is configured to alternate outputting the first matrix data between the first register set and the second register set.

In another embodiment of the hardware accelerator, the first matrix data comprise one column of the first matrix, and the second matrix data comprise one row of a second matrix.

In a further embodiment, a matrix expansion unit includes an input data selector configured to receive first matrix data in a columnwise format; a first register set, coupled to the input data selector, including a plurality of data selectors and a plurality of registers arranged in a first shift loop; a second register set, coupled to the data selector, including a plurality of data selectors and a plurality of registers arranged in a second shift loop; and an output data selector, coupled to the first register set and the second register set, configured to output second matrix data in a rowwise format.

In another embodiment of the matrix expansion unit, the first register set includes r data selectors and r registers, each data selector having a first input coupled to an output of the input data selector, a second input coupled to a preceding register in the first shift loop and an output coupled to an associated register.

In another embodiment of the matrix expansion unit, each register in the first shift loop is coupled to the output of the associated data selector and to the second input of a following data selector in the first shift loop.

In another embodiment of the matrix expansion unit, the second register set includes r data selectors and r registers, each data selector having a first input coupled to an output of the input data selector, a second input coupled to a preceding register in the second shift loop and an output coupled to an associated register.

In another embodiment of the matrix expansion unit, each register in the second shift loop is coupled to the output of the associated data selector and to the second input of a following data selector in the second shift loop.

In another embodiment of the matrix expansion unit, the input data selector is configured to alternate outputting the first matrix data between the first register set and the second register set.

In another embodiment of the matrix expansion unit, the input data selector is an input demultiplexor including an input and a plurality of outputs, the input configured to receive first matrix data; the output data selector is an output multiplexor including a plurality of inputs and a plurality of outputs; the first register set includes at least first, second, third and fourth multiplexors and at least first, second, third and fourth registers, where the first multiplexor has a first input coupled to a first output of the input demultiplexor, a second input coupled to the second register and an output coupled to the first register, the second multiplexor has a first input coupled to the first output of the input demultiplexor, a second input coupled to the third register and an output coupled to the second register, the third multiplexor has a first input coupled to the first output of the input demultiplexor, a second input coupled to the fourth register and an output coupled to the third register, the fourth multiplexor has a first input coupled to the first output of the input demultiplexor, a second input coupled to the first register and an output coupled to the fourth register, and the first, second, third and fourth registers are coupled to respective inputs of the output multiplexor; and the second register set includes at least first, second, third and fourth multiplexors and at least first, second, third and fourth registers, where the first multiplexor has a first input coupled to a second output of the input demultiplexor, a second input coupled to the second register and an output coupled to the first register, the second multiplexor has a first input coupled to the second output of the input demultiplexor, a second input coupled to the third register and an output coupled to the second register, the third multiplexor has a first input coupled to the second output of the input demultiplexor, a second input coupled to the fourth register and an output coupled to the third register, the fourth multiplexor has a first input coupled to the second output of the input demultiplexor, a second input coupled to the first register and an output coupled to the fourth register, and the first, second, third and fourth registers are coupled to respective inputs of the output multiplexor.

In another embodiment of the matrix expansion unit, the first matrix data comprise one column of a first matrix, and the second matrix data comprise one row of a second matrix.

In a further embodiment, a method for expanding a matrix using a matrix expansion unit includes receiving, at an input data selector, first matrix data in a columnwise format; providing, by the input data selector, the first matrix data to a first register set and a second register set, the first register set including a plurality of data selectors and a plurality of registers arranged in a first shift loop, and the second register set including a plurality of data selectors and a plurality of registers arranged in a second shift loop; and outputting, by an output data selector coupled to the first register set and the second register set, second matrix data in a rowwise format.

In another embodiment of the method, the first matrix data are periodically received; the first matrix data are alternatingly provided to the first register set and the second register set; and the second matrix data are continuously output.

In another embodiment of the method, the first matrix data comprise one column of a first matrix, and the second matrix data comprise one row of a second matrix.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hardware accelerator for an artificial neural network (ANN), comprising:
 a computing engine (CE) coupled to a memory configured to store a first matrix; and
 a matrix expansion unit, coupled to the memory and the CE, including:
  an input data selector configured to receive, from the memory, first matrix data in a columnwise format,
  a first register set, coupled to the input data selector, including a plurality of data selectors and a plurality of registers arranged in a first shift loop,
  a second register set, coupled to the input data selector, including a plurality of data selectors and a plurality of registers arranged in a second shift loop, and
  an output data selector, coupled to the first register set and the second register set, configured to output, to the CE, second matrix data in a rowwise format,
 where the first register set includes r data selectors and r registers, wherein r is a positive integer, each data selector having a first input coupled to an output of the input data selector, a second input coupled to a preceding register in the first shift loop and an output coupled to an associated register.

2. The hardware accelerator of claim 1, further comprising:
 a communication bus interface configured to:
  receive at least a portion of an ANN model with ANN weights, and input data, and
  transmit output data; and
 a controller, coupled to the communication bus interface and the memory, configured to extract the first matrix data from the input data, where:
the memory is further configured to store the portion of the ANN model, the ANN weights, the input data and the output data, and
the CE includes a plurality of multiply-and-accumulate (MAC) units.

3. The hardware accelerator of claim 2, where the ANN model is a convolutional neural network (CNN) model that includes an input layer, at least one convolutional layer, a fully-connected layer and an output layer.

4. The hardware accelerator of claim 1, where each register in the first shift loop is coupled to the output of an associated data selector and to the second input of a following data selector in the first shift loop.

5. The hardware accelerator of claim 4, where the second register set includes r data selectors and r registers, wherein r is a positive integer, each data selector having a first input coupled to an output of the input data selector, a second input coupled to a preceding register in the second shift loop and an output coupled to an associated register.

6. The hardware accelerator of claim 5, where each register in the second shift loop is coupled to the output of the associated data selector and to the second input of a following data selector in the second shift loop.

7. The hardware accelerator of claim 1, where the input data selector is configured to alternate outputting the first matrix data between the first register set and the second register set.

8. The hardware accelerator of claim 1, where the first matrix data comprise one column of the first matrix, and the second matrix data comprise one row of a second matrix.

9. A matrix expansion unit, comprising:
an input data selector configured to receive first matrix data in a columnwise format;
a first register set, coupled to the input data selector, including a plurality of data selectors and a plurality of registers arranged in a first shift loop;
a second register set, coupled to the data selector, including a plurality of data selectors and a plurality of registers arranged in a second shift loop; and
an output data selector, coupled to the first register set and the second register set, configured to output second matrix data in a rowwise format where the first register set includes r data selectors and r registers, wherein r is a positive integer, each data selector having a first input coupled to an output of the input data selector, a second input coupled to a preceding register in the first shift loop and an output coupled to an associated register.

10. The matrix expansion unit of claim 9, where each register in the first shift loop is coupled to the output of an associated data selector and to the second input of a following data selector in the first shift loop.

11. The matrix expansion unit of claim 10, where the second register set includes r data selectors and r registers, wherein r is a positive integer, each data selector having a first input coupled to an output of the input data selector, a second input coupled to a preceding register in the second shift loop and an output coupled to an associated register.

12. The matrix expansion unit of claim 11, where each register in the second shift loop is coupled to the output of the associated data selector and to the second input of a following data selector in the second shift loop.

13. The matrix expansion unit of claim 9, where the input data selector is configured to alternate outputting the first matrix data between the first register set and the second register set.

14. The matrix expansion unit of claim 9, where:
the input data selector is an input demultiplexor including an input and a plurality of outputs, the input configured to receive first matrix data;
the output data selector is an output multiplexor including a plurality of inputs and a plurality of outputs;
the first register set includes at least first, second, third and fourth multiplexors and at least first, second, third and fourth registers, where:
the first multiplexor has a first input coupled to a first output of the input demultiplexor, a second input coupled to the second register and an output coupled to the first register,
the second multiplexor has a first input coupled to the first output of the input demultiplexor, a second input coupled to the third register and an output coupled to the second register,
the third multiplexor has a first input coupled to the first output of the input demultiplexor, a second input coupled to the fourth register and an output coupled to the third register,
the fourth multiplexor has a first input coupled to the first output of the input demultiplexor, a second input coupled to the first register and an output coupled to the fourth register, and
the first, second, third and fourth registers are coupled to respective inputs of the output multiplexor; and
the second register set includes at least first, second, third and fourth multiplexors and at least first, second, third and fourth registers, where:
the first multiplexor has a first input coupled to a second output of the input demultiplexor, a second input coupled to the second register and an output coupled to the first register,
the second multiplexor has a first input coupled to the second output of the input demultiplexor, a second input coupled to the third register and an output coupled to the second register,
the third multiplexor has a first input coupled to the second output of the input demultiplexor, a second input coupled to the fourth register and an output coupled to the third register,
the fourth multiplexor has a first input coupled to the second output of the input demultiplexor, a second input coupled to the first register and an output coupled to the fourth register, and
the first, second, third and fourth registers are coupled to respective inputs of the output multiplexor.

15. The matrix expansion unit of claim 9, where the first matrix data comprise one column of a first matrix, and the second matrix data comprise one row of a second matrix.

16. A method for expanding a matrix using a matrix expansion unit, comprising:
receiving, at an input data selector, first matrix data in a columnwise format;
providing, by the input data selector, the first matrix data to a first register set and a second register set, the first register set including a plurality of data selectors and an associated plurality of registers arranged in a first shift loop, and the second register set including a plurality of data selectors and an associated plurality of registers arranged in a second shift loop;
selecting, by a data selector of the first register set, between first matrix data and data from a preceding register in the first shift loop;

providing data selected by the data selector of the first register set to an associated register in the first shift loop;

selecting, by a data selector of the second register set, between first matrix data and data from a preceding register in the second shift loop;

providing data selected by the data selector of the second register set to an associated register in the second shift loop; and outputting, by an output data selector coupled to the plurality of registers of the first register set and the plurality of registers of the second register set, second matrix data in a rowwise format.

17. The method of claim 16, where:

the first matrix data are periodically received;

the first matrix data are alternatingly provided to the first register set and the second register set; and the second matrix data are continuously output.

18. The method of claim 17, where the first matrix data comprise one column of a first matrix, and the second matrix data comprise one row of a second matrix.

\* \* \* \* \*